(12) United States Patent
Pabla

(10) Patent No.: US 11,849,334 B2
(45) Date of Patent: *Dec. 19, 2023

(54) SYSTEM AND METHOD FOR SPECTRUM SUBLICENSING

(71) Applicant: Arbinder Pabla, San Jose, CA (US)

(72) Inventor: Arbinder Pabla, San Jose, CA (US)

(73) Assignee: Arbinder Pabla, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/080,771

(22) Filed: Dec. 14, 2022

(65) Prior Publication Data

US 2023/0113662 A1     Apr. 13, 2023

Related U.S. Application Data

(63) Continuation of application No. 17/118,160, filed on Dec. 10, 2020, now Pat. No. 11,558,753.

(60) Provisional application No. 62/946,040, filed on Dec. 10, 2019.

(51) Int. Cl.
*H04W 16/14*     (2009.01)

(52) U.S. Cl.
CPC .................. *H04W 16/14* (2013.01)

(58) Field of Classification Search
CPC .................................................... H04W 16/14
See application file for complete search history.

(56) References Cited

U.S. PATENT DOCUMENTS

| | | | |
|---|---|---|---|
| 10,039,105 B1* | 7/2018 | Baeder | H04W 72/0453 |
| 2009/0327074 A1* | 12/2009 | Callaway, Jr. | G06Q 50/188 |
| | | | 705/14.49 |
| 2012/0014332 A1 | 1/2012 | Smith et al. | |
| 2012/0120887 A1 | 5/2012 | Deaton et al. | |
| 2012/0134328 A1 | 5/2012 | Gauvreau et al. | |
| 2012/0246744 A1 | 9/2012 | Kagawa | |
| 2013/0196677 A1* | 8/2013 | Smith | H04W 72/56 |
| | | | 455/452.1 |
| 2013/0295948 A1* | 11/2013 | Ye | H04W 16/14 |
| | | | 455/452.1 |
| 2013/0310000 A1 | 11/2013 | Prasad et al. | |
| 2015/0326377 A1 | 11/2015 | Freda et al. | |
| 2016/0234850 A1 | 8/2016 | Freda et al. | |
| 2016/0259923 A1* | 9/2016 | Papa | H04W 12/35 |
| 2016/0373935 A1 | 12/2016 | Smith et al. | |
| 2019/0340098 A1 | 11/2019 | Green, III et al. | |

(Continued)

OTHER PUBLICATIONS

International Search Report and Written Opinion dated Mar. 11, 2021, corresponding PCT/US2020/064289, 13 pages.

(Continued)

*Primary Examiner* — Dai Phuong
(74) *Attorney, Agent, or Firm* — XSENSUS LLP

(57) ABSTRACT

A method and system of sublicensing licensed spectrum that includes establishing, by infrastructure equipment of a wireless network, sub-license terms for a radio device to operate within the licensed spectrum; retrieving, by the infrastructure equipment, the sub-license terms for operating the radio device within the licensed spectrum upon receiving a request from the radio device; and configuring the radio device to operate within the licensed spectrum in accordance with the terms of the sub-license via a virtualized interface between the infrastructure equipment and the radio device.

7 Claims, 12 Drawing Sheets

(56) References Cited

U.S. PATENT DOCUMENTS

2019/0357255 A1 11/2019 Sun et al.
2020/0205060 A1* 6/2020 Karimli ................ H04W 24/10

OTHER PUBLICATIONS

Huiyang Wang, "Short-Term Spectrum Sharing With Economic Awareness in 5G Networks", University of Technology Sydney, Oct. 2017, total 191 pages. Retrieved from <URL: https://opus.lib.uts.edu.au/bitstream/10453/120350/2/02whole.pdf>.

* cited by examiner

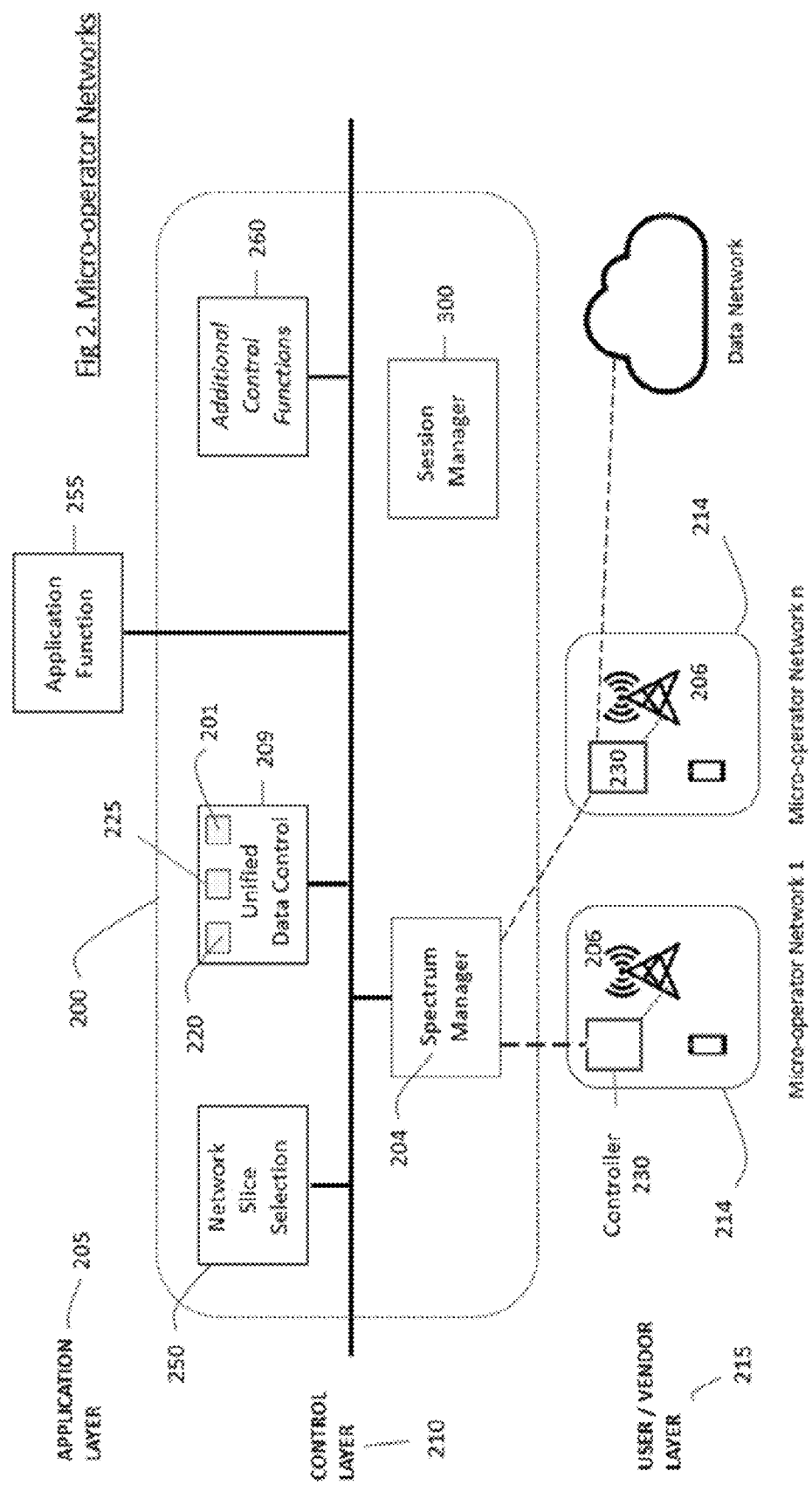

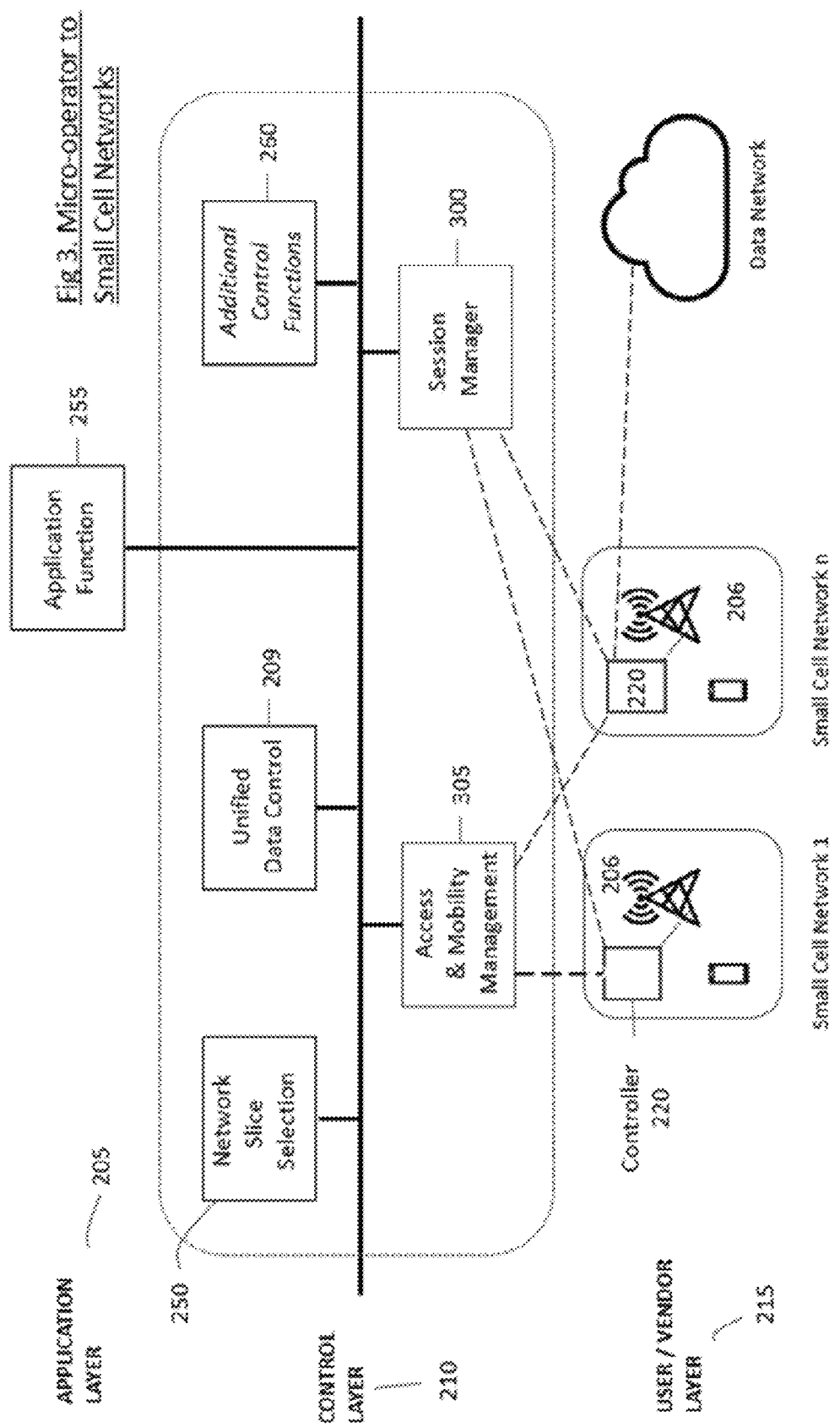

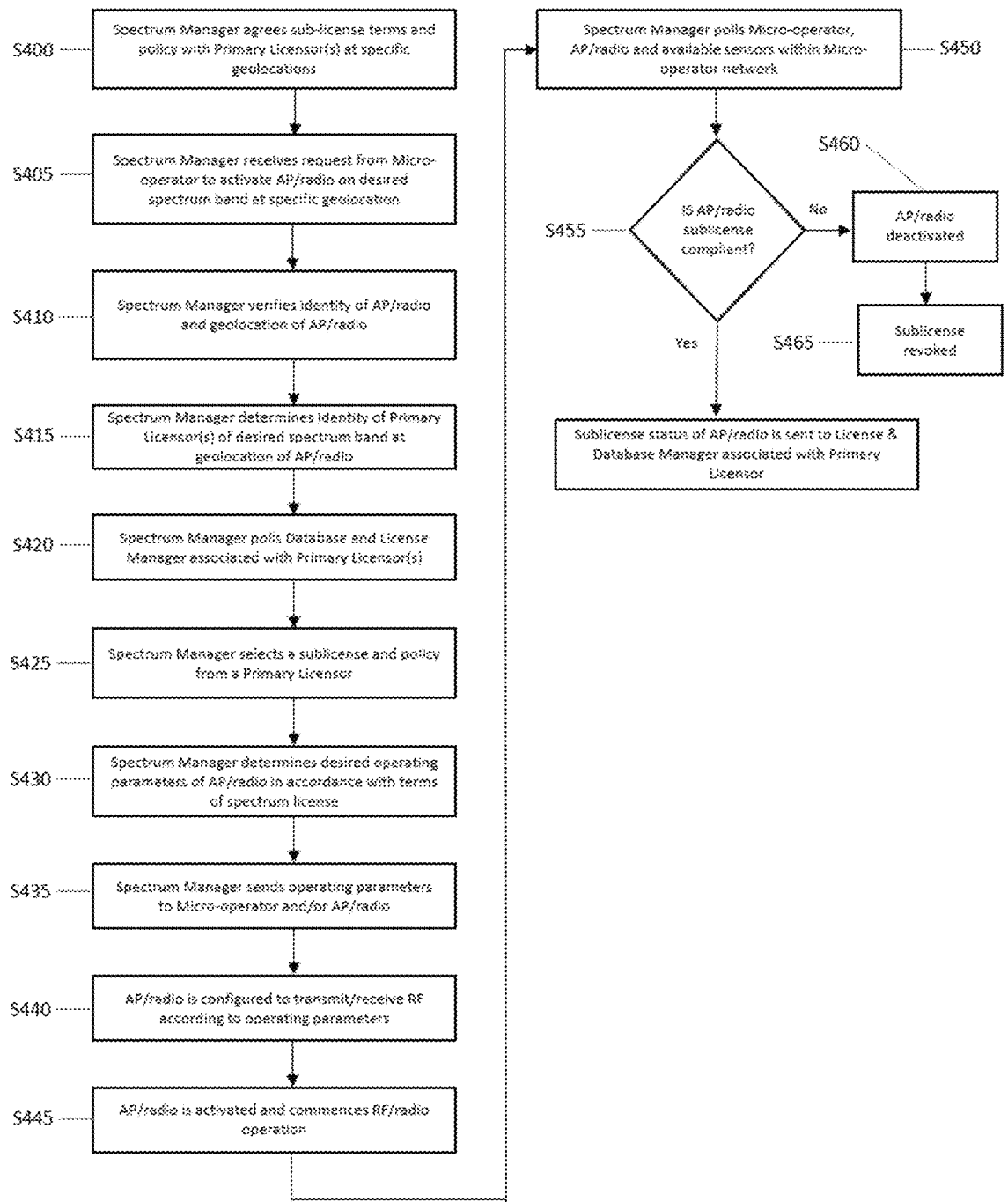
Fig. 4 - Method for Spectrum Manager sublicensing spectrum to AP/radio

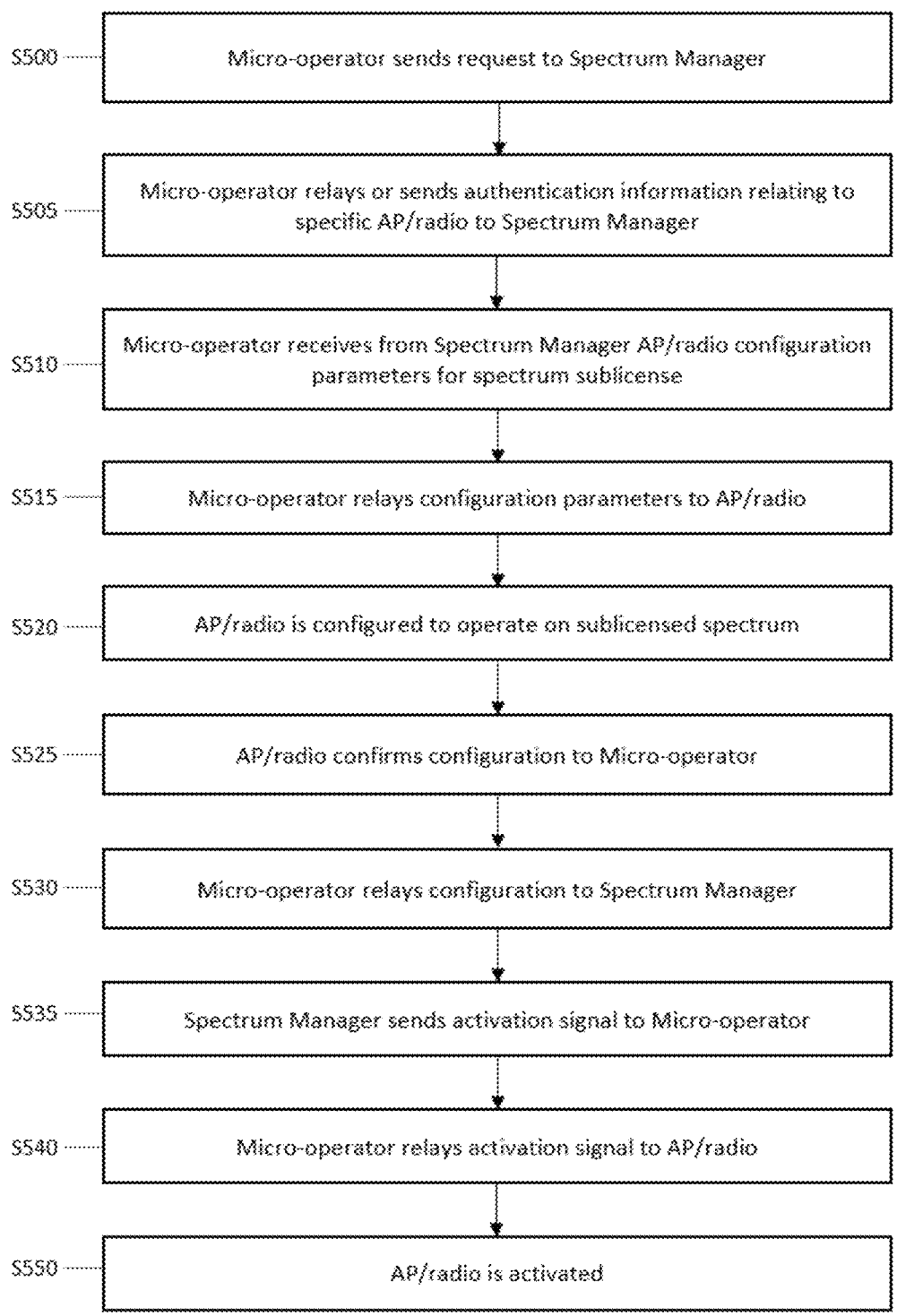

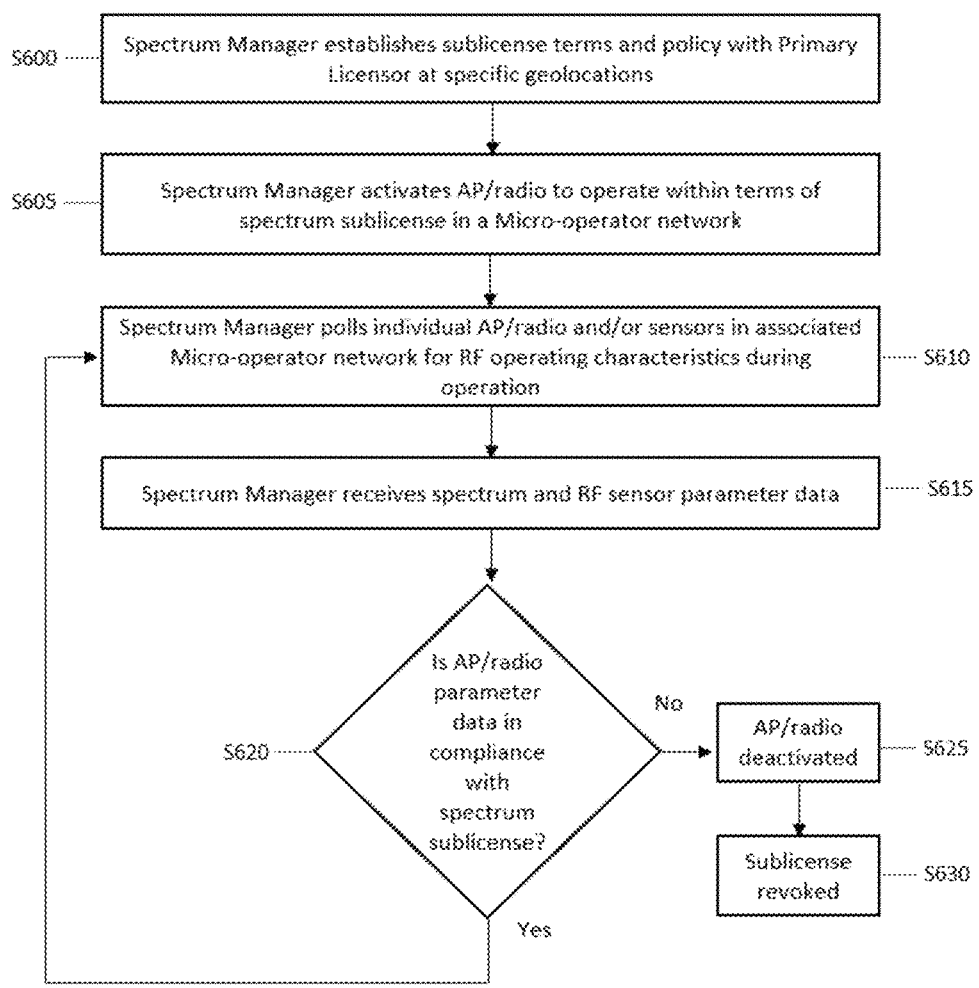
Fig. 6 Method for monitoring AP/radio compliance with spectrum sublicense

SYSTEM AND METHOD FOR SPECTRUM SUBLICENSING

CROSS REFERENCE TO RELATED APPLICATION

The present application is a continuation of U.S. application Ser. No. 17/118,160, filed Dec. 10, 2020 which claims the benefit of the earlier filing date of U.S. Provisional Patent Application Ser. No. 62/946,040 filed on Dec. 10, 2019, the entire contents of which are incorporated herein by reference.

FIELD

The present disclosure relates to systems and methods for radio frequency spectrum sublicensing and further use thereof.

BACKGROUND

In the United States, the Federal Communications Commission (FCC) together with the National Telecommunications and Information Administration (NTIA), allocate, administer, and generally grant spectrum licenses in defined geographic domains. Other governmental bodies perform a similar role in many other countries. As a result, each geolocation within an administered region may have both licensed and unlicensed wireless spectrum of which the primary licenses are assigned to specific entities who may be commercial wireless network operators. Networks and devices, being radio frequency (RF) emitters in a specified licensed spectrum (or band), may be permanently or temporally situated in a particular geolocation and may be operated by a license owner. The types of networks or wireless infrastructure that may utilize specific licensed spectrum bands may also vary by application and purpose. One example type is licensed spectrum cellular networks for provisioning 3rd Generation Partnership Project (3GPP)-compliant cellular services such as 3G, 4G, LTE and increasingly 5G class services, such as those generally installed and operated by mobile network operators. Another example type is licensed spectrum fixed wireless networks, for wireless internet access services provisioning as an alternative to fixed line services. Increasingly, there is a move toward utilizing millimeter band frequencies (mmWave) for such 5G type services, for example the 24 GHz, 28 GHz and 37 GHz bands in the United States.

The primary spectrum licenses granted by regulating authorities generally have broad geo-coverage, spanning city, counties, states, or even larger regions. Across the geo-region the spectrum license owner will most likely have exclusive rights to use that spectrum for the period of the license, which may be several years. However, during the term of this license the spectrum may not be well utilized all the time or any of the time within a sub-region of the geo-region for which the license is awarded. Reasons for under-utilization may include, for example, the lack of suitable deployed wireless infrastructure or the financial burden of installing and then operating and maintaining the infrastructure by the primary spectrum license owner, even though there may be mobile or other radio devices within this geo-region that are capable of utilizing that spectrum. This circumstance is, for example, more likely to arise when the licensed spectrum is newly acquired and is also more likely to be the case in mmWave bands because the range of such RF is intrinsically low, requiring a greater density of infrastructure to be deployed. Such underutilization of spectrum creates situations where spectrum owners may acquire and sit on spectrum licenses for extended periods of the license term, or create sub-regions of the geo-region that are lesser priority for the spectrum owner, or much later in its infrastructure roll out plan. This underutilization, or the pockets of underutilization, can be reduced or even eliminated if the spectrum license owner has a method and means to sub-license the licensed spectrum to other users, and has further means to authorize, administer, and monetize the sub-licenses.

Recently, various regulatory authorities have assessed that it may be necessary to enable spectrum to be shared, though the circumstances, and framework for sharing spectrum is not mature. Therefore, a need exists for a system and a method for primary spectrum licensees to authorize and administer time-limited sub-licenses of this spectrum to third parties within their geographic license domain. A further need exists for a system and method to enable third party micro-operators of wireless services utilizing these spectrum sub-licenses to co-exist alongside wireless services from primary spectrum licensors.

SUMMARY

Described herein are systems and methods for sub-licensing or sharing of wireless spectrum between users, at least one of whom has primary rights to use specified wireless spectrum for the provisioning of RF services in a specified geo-location or geo-region. The disclosure includes a computerized system for wireless spectrum sub-licensing between parties in a specified geolocation and further includes a method to enable sharing, mutual co-existence of user parties, sub-licensing and spectrum-related transactions between users in a specified geolocation.

Also disclosed is a method to enable a micro-operator network to transform into a small cell network functionally and operationally under the predominant control of the mobile network operator who is concomitantly the primary spectrum licensor.

BRIEF DESCRIPTION OF THE DRAWINGS

The scope of the present disclosure is best understood from the following detailed description of exemplary embodiments when read in conjunction with the accompanying drawings, wherein:

FIG. 2 is a system diagram that shows an example of a system architecture according to an exemplary embodiment of the present disclosure;

FIG. 3 is a system diagram that shows an example of a system architecture according to an exemplary embodiment of the present disclosure;

FIG. 4 is a flow chart showing an exemplary process according to an exemplary embodiment of the present disclosure;

FIG. 5 is a flow chart showing an exemplary process according to an exemplary embodiment of the present disclosure; and FIG. 6 is a flow chart showing an exemplary process according to an exemplary embodiment of the present disclosure.

Figure 1A:
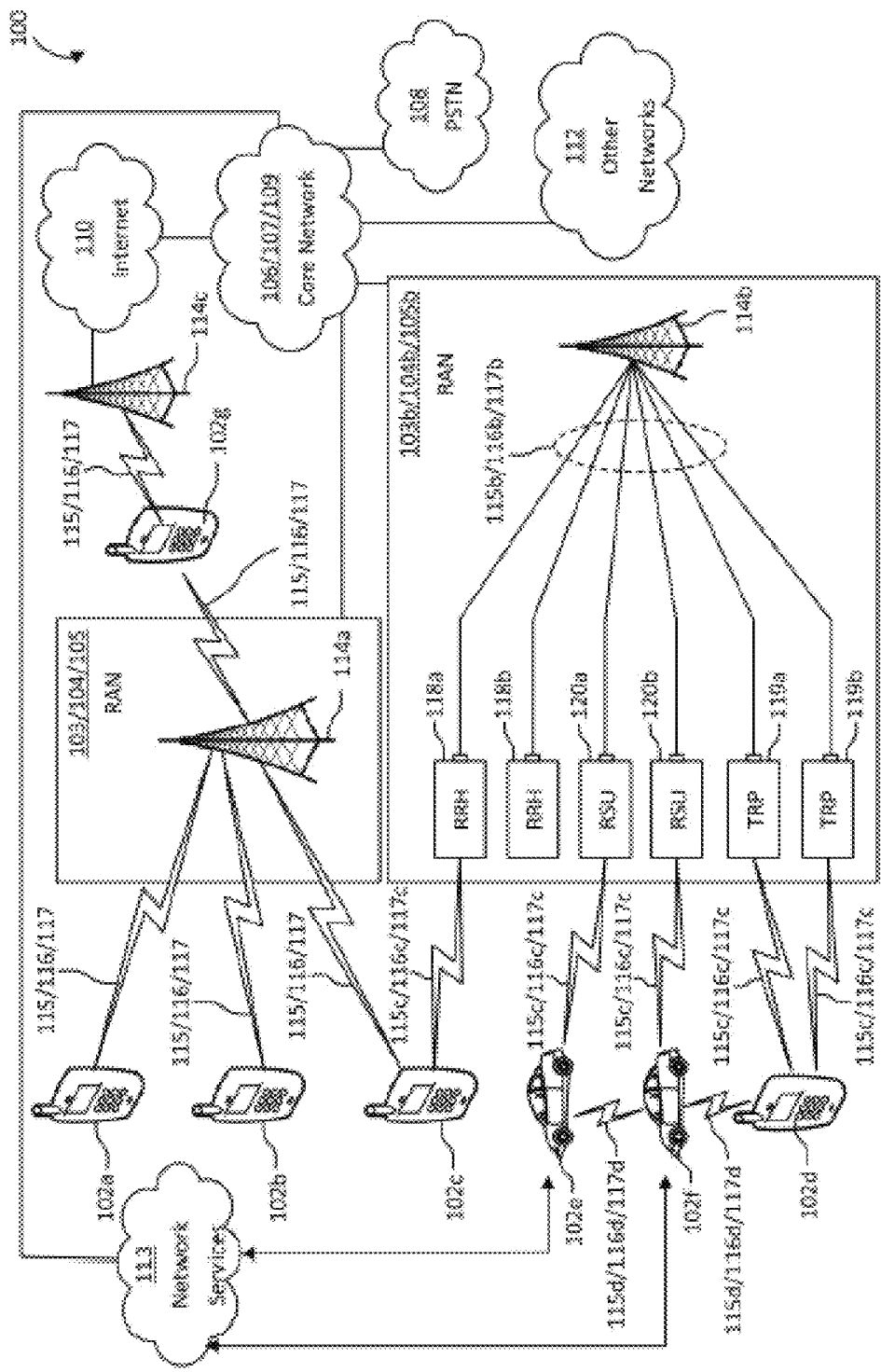
FIG. 1A is a system diagram that shows an example 3GPP architecture.

Further areas of applicability of the present disclosure will become apparent from the detailed description provided hereinafter. It should be understood that the detailed description of exemplary embodiments is intended for illustration purposes only and are, therefore, not intended to necessarily limit the scope of the disclosure.

DETAILED DESCRIPTION

In the United States, the federal government has historically granted technology-agnostic licenses to spectrum, for example allowing licensed mobile network operators to use the technology of their choice, whether that be Global System for Mobile Communications (GSM), Code-division multiple access (CDMA) or something else. Comparatively, in Europe, national governments have tended to tie spectrum licenses to specific technology usage, e.g. to GSM. The comparative advantage of not tying a spectrum license to a specific technology gives greater flexibility in how a radio device may operate and how it may be deployed. A spectrum license owner can for example deploy proprietary connectivity technologies to provision non-cellular wireless services without being limited to technology based on 3GPP, whilst using the same spectrum to provision cellular type services using 3GPP in the same geo-region.

In recent years there has also been a growing interest in deploying private networks on licensed spectrum, that run independently of the public cellular network. For example, private LTE networks being private networks using localized spectrum licenses employing LTE technology, have certain advantages relative to private networks deployed on unlicensed spectrum. These advantages including enabling connectivity with higher quality of service factors such as link reliability and security than can be provisioned in a network that operates on unlicensed spectrum such as WiFi. Such private licensed spectrum networks may exclusively provision connectivity to non-mobile user equipment, for example, to assets in an industrial setting. Alternatively, a private network may also provision connectivity services in licensed spectrum to mobile user equipment (such as mobile handsets) that may move into or out of the network coverage area of the private network, in which case, the private network would need to incorporate a permissible technology standard for enabling general mobile connectivity in other networks, such as 3GPP. In either case, there are situations, and geolocations, that would benefit from deployment and operation of private networks using licensed spectrum that is exclusively licensed to an owner/operator of a private network. This disclosure considers the case of private networks operating in licensed spectrum that is sublicensed from a primary licensor entity that has the primary license to use that spectrum in a specific geolocation. Without limitations, the disclosure considers an exemplary private network, which operates a wireless connectivity method for enabling wireless radio devices to be configured, activated, and then operated under such a sublicense in a manner than conforms fully with the primary licensor's obligations to activate and operate radio devices on the licensed spectrum. The private network may, optionally, incorporate 3GPP technology as a connectivity scheme for user devices. Optionally, the private network may implement a proprietary connectivity technology protocol connectivity to user devices. In either case, so long as the private network operates in a manner that it complies with the terms of the spectrum sublicense, the choice of technology implemented by the private network need not be limited other than by the specific terms of the sublicense itself. Preferentially, and most flexibly, the spectrum sublicense made available to the private network by the primary licensor does not specify the specific technology (e.g. 3GPP) to be utilized by the private network or the radio device operating under the spectrum sublicense. In another case, the radio device may operate under a spectrum sublicense that requires it to conform with a specific technology standard, such as 3GPP.

In recent years there has also been a growing interest in creating a more open and competitive Radio Access Network ecosystem, by building a virtualized RAN on open hardware and cloud, with embedded AI-powered radio control. These open standard architectures, such as O-Ran Alliance, and Open RAN, are architected so-as-to be supportive and complimentary to technology standards promoted by 3GPP and other industry standards organizations.

The combination of a technology agnostic spectrum sublicense method as disclosed, juxtaposed with an open standard architecture for the private network, enables flexibilities that can benefit all stakeholders—licensors, private network operators, and users of the networks, both economically and functionally.

While the present disclosure is not limited to a 3GPP-based architecture, the description provided below is a an exemplary 3GPP architecture in which the disclosed systems and methods may be implemented.

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), LTE-Advanced standards, and New Radio (NR), which is also referred to as "5G". 3GPP NR standards development is expected to continue and include the definition of next generation radio access technology (new RAT), which is expected to include the provision of new flexible radio access below 7 GHz, and the provision of new ultra-mobile broadband radio access above 7 GHz. The flexible radio access is expected to consist of a new, non-backwards compatible radio access in new spectrum below 7 GHz, and it is expected to include different operating modes that may be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 7 GHz, with cmWave and mmWave specific design optimizations.

3GPP has identified a variety of use cases that NR is expected to support, resulting in a wide variety of user experience requirements for data rate, latency, and mobility. The use cases include the following general categories:

enhanced mobile broadband (eMBB) ultra-reliable low-latency Communication (URLLC), massive machine type communications (mMTC), network operation (e.g., network slicing, routing, migration and interworking, energy savings), and enhanced vehicle-to-everything (eV2X) communications, which may include any of Vehicle-to-Vehicle Communication (V2V), Vehicle-to-Infrastructure Communication (V2I), Vehicle-to-Network Communication (V2N), Vehicle-to-Pedestrian Communication (V2P), and vehicle communications with other entities. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, virtual reality, home automation, robotics, and aerial drones to name a few. All of these use cases and others are contemplated herein.

The following is a list of acronyms relating to service level and core network technologies that may appear in the below description. Unless otherwise specified, the acronyms used herein refer to the corresponding term listed below.

TABLE 1

| | Abbreviations |
|---|---|
| 5GC | 5G Core Network |
| AF | Application Function |
| AMF | Access and Mobility Management Function |
| ANDSP | Access Network Discovery and Selection Policy |
| AUSF | Authentication Server Function |
| CDR | Charging Data Record |
| DNN | Data Network Name |
| EAP | Extensible Authentication Protocol |
| GUI | Graphical User Interface |
| GUTI | Globally Unique Temporary Identifier |
| HPLMN | Home PLMN |
| IMEI | International Mobile Equipment Identity |
| IMSI | International Mobile Subscriber Identity |
| MCC | Mobile Country Code |
| MNC | Mobile Network Code |
| 5GC | 5G Core Network |
| MNO | Mobile Network Operator |
| MSIN | Mobile Subscription Identification Number |
| NAS | Non-Access Stratum |
| NF | Network Function |
| NRF | Network Repository Function |
| NSSP | Network Slice Selection Policy |
| NSSAI | Network Slice Selection Assistance Information |
| PCF | Policy Control Function |
| PDU | Protocol Data Unit |
| PEI | Permanent Equipment Identifier |
| PLMN | Public Land Mobile Network |
| PSI | Policy Section Identifier |
| SD | Slice Differentiator |
| SIM | Subscriber Identification Module |
| S-NSSAI | Single NSSAI |
| SST | Slice/Service Type |
| SUCI | Subscription Concealed Identifier |
| SUPI | Subscription Permanent Identifier |
| UDM | User Data Management |
| UDR | Unified Data Repository |
| UE | User Equipment |
| 5GC | 5G Core Network |
| UPF | User Plane Function |
| URSP | UE Route Selection Policy |
| VPLMN | Visited PLMN |

Example Communication System and Networks

FIG. 1A illustrates an example communications system 100 in which the systems, methods, and apparatuses described and claimed herein may be used. The communications system 100 may include wireless transmit/receive units (WTRUs) 102a, 102b, 102c, 102d, 102e, 102f, and/or 102g, which generally or collectively may be referred to as WTRU 102 or WTRUs 102. The communications system 100 may include, a radio access network (RAN) 103/104/105/103b/104b/105b, a core network 106/107/109, a public switched telephone network (PSTN) 108, the Internet 110, other networks 112, and Network Services 113. 113. Network Services 113 may include, for example, a V2X server, V2X functions, a ProSe server, ProSe functions, IoT services, video streaming, and/or edge computing, etc.

It will be appreciated that the concepts disclosed herein may be used with any number of WTRUs, base stations, networks, and/or network elements. Each of the WTRUs 102 may be any type of apparatus or device configured to operate and/or communicate in a wireless environment. In the example of FIG. 1A, each of the WTRUs 102 is depicted in FIGS. 1A-1E as a hand-held wireless communications apparatus. It is understood that with the wide variety of use cases contemplated for wireless communications, each WTRU may comprise or be included in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, bus or truck, a train, or an airplane, and the like.

The communications system 100 may also include a base station 114a and a base station 114b. In the example of FIG. 1A, each base stations 114a and 114b is depicted as a single element. In practice, the base stations 114a and 114b may include any number of interconnected base stations and/or network elements. Base stations 114a may be any type of device configured to wirelessly interface with at least one of the WTRUs 102a, 102b, and 102c to facilitate access to one or more communication networks, such as the core network 106/107/109, the Internet 110, Network Services 113, and/or the other networks 112. Similarly, base station 114b may be any type of device configured to wiredly and/or wirelessly interface with at least one of the Remote Radio Heads (RRHs) 118a, 118b, Transmission and Reception Points (TRPs) 119a, 119b, and/or Roadside Units (RSUs) 120a and 120b to facilitate access to one or more communication networks, such as the core network 106/107/109, the Internet 110, other networks 112, and/or Network Services 113. RRHs 118a, 118b may be any type of device configured to wirelessly interface with at least one of the WTRUs 102, e.g., WTRU 102c, to facilitate access to one or more communication networks, such as the core network 106/107/109, the Internet 110, Network Services 113, and/or other networks 112.

TRPs 119a, 119b may be any type of device configured to wirelessly interface with at least one of the WTRU 102d, to facilitate access to one or more communication networks, such as the core network 106/107/109, the Internet 110, Network Services 113, and/or other networks 112. RSUs 120a and 120b may be any type of device configured to wirelessly interface with at least one of the WTRU 102e or 102f, to facilitate access to one or more communication networks, such as the core network 106/107/109, the Internet 110, other networks 112, and/or Network Services 113. By way of example, the base stations 114a, 114b may be a Base Transceiver Station (BTS), a Node-B, an eNode B, a Home Node B, a Home eNode B, a Next Generation Node-B (gNode B), a satellite, a site controller, an access point (AP), a wireless router, and the like.

The base station 114a may be part of the RAN 103/104/105, which may also include other base stations and/or network elements (not shown), such as a Base Station Controller (BSC), a Radio Network Controller (RNC), relay nodes, etc. Similarly, the base station 114b may be part of the RAN 103b/104b/105b, which may also include other base stations and/or network elements (not shown), such as a BSC, a RNC, relay nodes, etc. The base station 114a may be configured to transmit and/or receive wireless signals within a particular geographic region, which may be referred to as a cell (not shown). Similarly, the base station 114b may be configured to transmit and/or receive wired and/or wireless signals within a particular geographic region, which may be referred to as a cell (not shown). The cell may further be divided into cell sectors. For example, the cell associated with the base station 114a may be divided into three sectors. Thus, for example, the base station 114a may include three transceivers, e.g., one for each sector of the cell. The base station 114a may employ Multiple-Input Multiple Output (MIMO) technology and, therefore, may utilize multiple transceivers for each sector of the cell, for instance.

The base station 114a may communicate with one or more of the WTRUs 102a, 102b, 102c, and 102g over an air interface 115/116/117, which may be any suitable wireless communication link (e.g., Radio Frequency (RF), microwave, infrared (IR), ultraviolet (UV), visible light, cmWave, mmWave, etc.). The air interface 115/116/117 may be established using any suitable Radio Access Technology (RAT).

The base station 114b may communicate with one or more of the RRHs 118a and 118b, TRPs 119a and 119b, and/or RSUs 120a and 120b, over a wired or air interface 115b/116b/117b, which may be any suitable wired (e.g., cable, optical fiber, etc.) or wireless communication link (e.g., RF, microwave, IR, UV, visible light, cmWave, mmWave, etc.). The air interface 115b/116b/117b may be established using any suitable RAT.

The RRHs 118a, 118b, TRPs 119a, 119b and/or RSUs 120a, 120b, may communicate with one or more of the WTRUs 102c, 102d, 102e, 102f over an air interface 115c/116c/117c, which may be any suitable wireless communication link (e.g., RF, microwave, IR, ultraviolet UV, visible light, cmWave, mmWave, etc.) The air interface 115c/116c/117c may be established using any suitable RAT.

The WTRUs 102 may communicate with one another over a direct air interface 115d/116d/117d, such as Sidelink communication which may be any suitable wireless communication link (e.g., RF, microwave, IR, ultraviolet UV, visible light, cmWave, mmWave, etc.) The air interface 115d/116d/117d may be established using any suitable RAT.

The communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c, or RRHs 118a, 118b, TRPs 119a, 119b and/or RSUs 120a and 120b in the RAN 103b/104b/105b and the WTRUs 102c, 102d, 102e, and 102f, may implement a radio technology such as Universal Mobile Telecommunications System (UMTS) Terrestrial Radio Access (UTRA), which may establish the air interface 115/116/117 and/or 115c/116c/117c respectively using Wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

The base station 114a in the RAN 103/104/105 and the WTRUs 102a, 102b, 102c, and 102g, or RRHs 118a and 118b, TRPs 119a and 119b, and/or RSUs 120a and 120b in the RAN 103b/104b/105b and the WTRUs 102c, 102d, may implement a radio technology such as Evolved UNITS Terrestrial Radio Access (E-UTRA), which may establish the air interface 115/116/117 or 115c/116c/117c respectively using Long Term Evolution (LTE) and/or LTE-Advanced (LTE-A), for example. The air interface 115/116/117 or 115c/116c/117c may implement 3GPP NR technology. The LTE and LTE-A technology may include LTE D2D and/or V2X technologies and interfaces (such as Sidelink communications, etc.) Similarly, the 3GPP NR technology may include NR V2X technologies and interfaces (such as Sidelink communications, etc.)

The base station 114a in the RAN 103/104/105 and the WTRUs 102a, 102b, 102c, and 102g or RRHs 118a and 118b, TRPs 119a and 119b, and/or RSUs 120a and 120b in the RAN 103b/104b/105b and the WTRUs 102c, 102d, 102e, and 102f may implement radio technologies such as IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114c in FIG. 1A may be a wireless router, Home Node B, Home eNode B, or access point, for example, and may utilize any suitable RAT for facilitating wireless connectivity in a localized area, such as a place of business, a home, a vehicle, a train, an aerial, a satellite, a manufactory, a campus, and the like. The base station 114c and the WTRUs 102, e.g., WTRU 102e, may implement a radio technology such as IEEE 802.11 to establish a Wireless Local Area Network (WLAN). Similarly, the base station 114c and the WTRUs 102, e.g., WTRU 102d, may implement a radio technology such as IEEE 802.15 to establish a wireless personal area network (WPAN). The base station 114c and the WTRUs 102, e.g., WRTU 102e, may utilize a cellular-based RAT (e.g., WCDMA, CDMA2000, GSM, LTE, LTE-A, NR, etc.) to establish a picocell or femtocell. As shown in FIG. 1A, the base station 114c may have a direct connection to the Internet 110. Thus, the base station 114c may not be required to access the Internet 110 via the core network 106/107/109.

The RAN 103/104/105 and/or RAN 103b/104b/105b may be in communication with the core network 106/107/109, which may be any type of network configured to provide voice, data, messaging, authorization and authentication, applications, and/or Voice Over Internet Protocol (VoIP) services to one or more of the WTRUs 102. For example, the core network 106/107/109 may provide call control, billing services, mobile location-based services, pre-paid calling, Internet connectivity, packet data network connectivity, Ethernet connectivity, video distribution, etc., and/or perform high-level security functions, such as user authentication.

Although not shown in FIG. 1A, it will be appreciated that the RAN 103/104/105 and/or RAN 103b/104b/105b and/or the core network 106/107/109 may be in direct or indirect communication with other RANs that employ the same RAT as the RAN 103/104/105 and/or RAN 103b/104b/105b or a different RAT. For example, in addition to being connected to the RAN 103/104/105 and/or RAN 103b/104b/105b, which may be utilizing an E-UTRA radio technology, the core network 106/107/109 may also be in communication with another RAN (not shown) employing a GSM or NR radio technology.

The core network 106/107/109 may also serve as a gateway for the WTRUs 102 to access the PSTN 108, the Internet 110, and/or other networks 112. The PSTN 108 may include circuit-switched telephone networks that provide Plain Old Telephone Service (POTS). The Internet 110 may include a global system of interconnected computer networks and devices that use common communication protocols, such as the Transmission Control Protocol (TCP), User Datagram Protocol (UDP), and the internet protocol (IP) in the TCP/IP internet protocol suite. The other networks 112 may include wired or wireless communications networks owned and/or operated by other service providers. For example, the networks 112 may include any type of packet data network (e.g., an IEEE 802.3 Ethernet network) or another core network connected to one or more RANs, which may employ the same RAT as the RAN 103/104/105 and/or RAN 103b/104b/105b or a different RAT.

Some or all of the WTRUs 102a, 102b, 102c, 102d, 102e, and 102f in the communications system 100 may include multi-mode capabilities, e.g., the WTRUs 102a, 102b, 102c, 102d, 102e, and 102f may include multiple transceivers for communicating with different wireless networks over different wireless links. For example, the WTRU 102g shown in FIG. 1A may be configured to communicate with the base station 114a, which may employ a cellular-based radio technology, and with the base station 114c, which may employ an IEEE 802 radio technology.

Although not shown in FIG. 1A, it will be appreciated that a User Equipment may make a wired connection to a gateway. The gateway maybe a Residential Gateway (RG). The RG may provide connectivity to a Core Network 106/107/109. It will be appreciated that many of the ideas contained herein may equally apply to UEs that are WTRUs and UEs that use a wired connection to connect to a network. For example, the ideas that apply to the wireless interfaces 115, 116, 117 and 115c/116c/117c may equally apply to a wired connection.

Figure 1B:
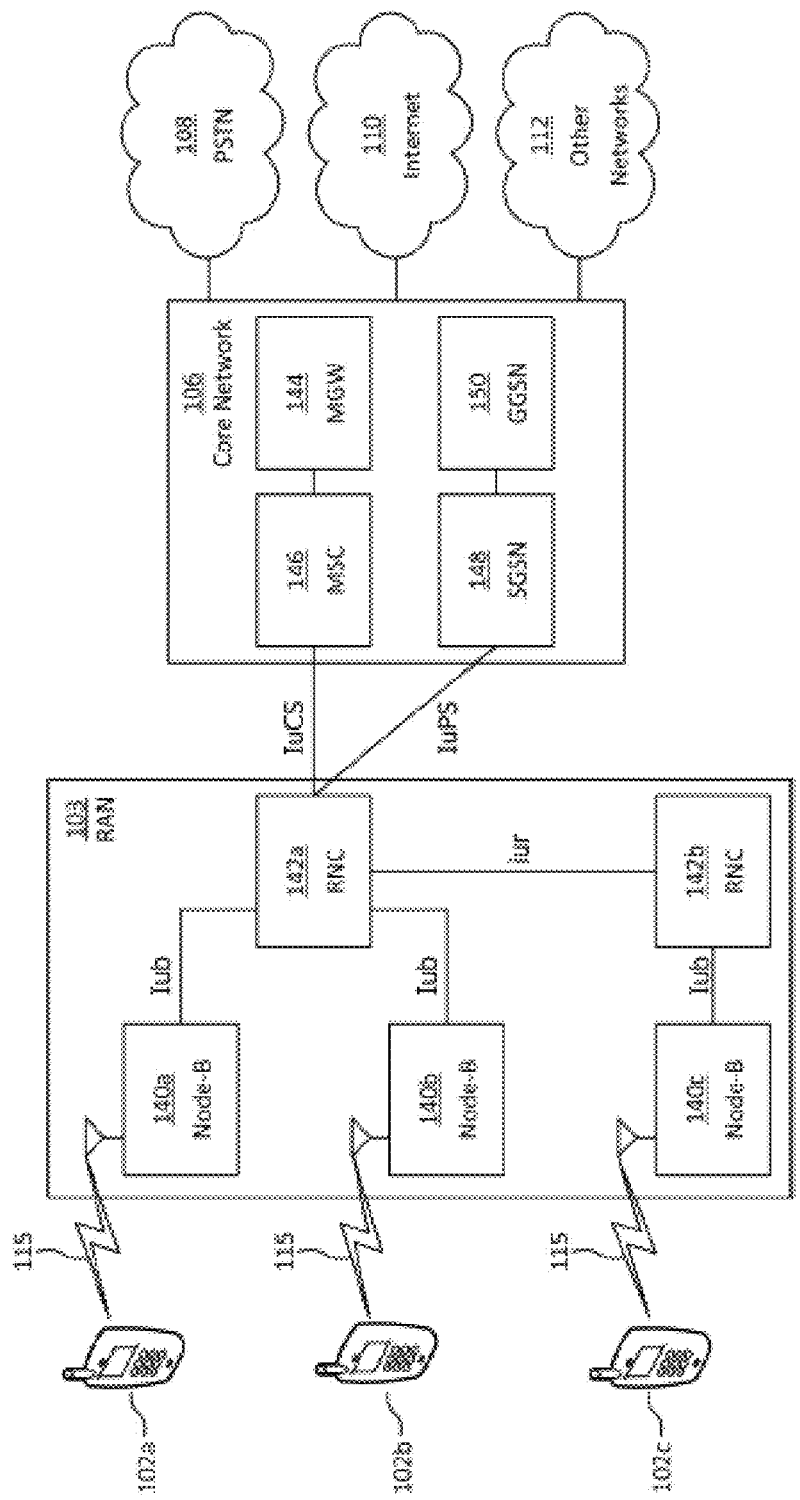
FIG. 1B is a system diagram that shows an example of a Radio Access Network (RAN) architecture and a core network architecture.

FIG. 1B is a system diagram of an example RAN 103 and core network 106. As noted above, the RAN 103 may employ a UTRA radio technology to communicate with the WTRUs 102a, 102b, and 102c over the air interface 115. The RAN 103 may also be in communication with the core network 106. As shown in FIG. 1B, the RAN 103 may include Node-Bs 140a, 140b, and 140c, which may each include one or more transceivers for communicating with the WTRUs 102a, 102b, and 102c over the air interface 115. The Node-Bs 140a, 140b, and 140c may each be associated with a particular cell (not shown) within the RAN 103. The RAN 103 may also include RNCs 142a, 142b. It will be appreciated that the RAN 103 may include any number of Node-Bs and Radio Network Controllers (RNCs.)

As shown in FIG. 1B, the Node-Bs 140a, 140b may be in communication with the RNC 142a. Additionally, the Node-B 140c may be in communication with the RNC 142b. The Node-Bs 140a, 140b, and 140c may communicate with the respective RNCs 142a and 142b via an Iub interface. The RNCs 142a and 142b may be in communication with one another via an Iur interface. Each of the RNCs 142a and 142b may be configured to control the respective Node-Bs 140a, 140b, and 140c to which it is connected. In addition, each of the RNCs 142a and 142b may be configured to carry out or support other functionality, such as outer loop power control, load control, admission control, packet scheduling, handover control, macro-diversity, security functions, data encryption, and the like.

The core network 106 shown in FIG. 1B may include a media gateway (MGW) 144, a Mobile Switching Center (MSC) 146, a Serving GPRS Support Node (SGSN) 148, and/or a Gateway GPRS Support Node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, and 102c with access to circuit-switched networks, such as the PSTN 108, to facilitate communications between the WTRUs 102a, 102b, and 102c, and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, and 102c with access to packet-switched networks, such as the Internet 110, to facilitate communications between and the WTRUs 102a, 102b, and 102c, and IP-enabled devices.

The core network 106 may also be connected to the other networks 112, which may include other wired or wireless networks that are owned and/or operated by other service providers.

Figure 1C:
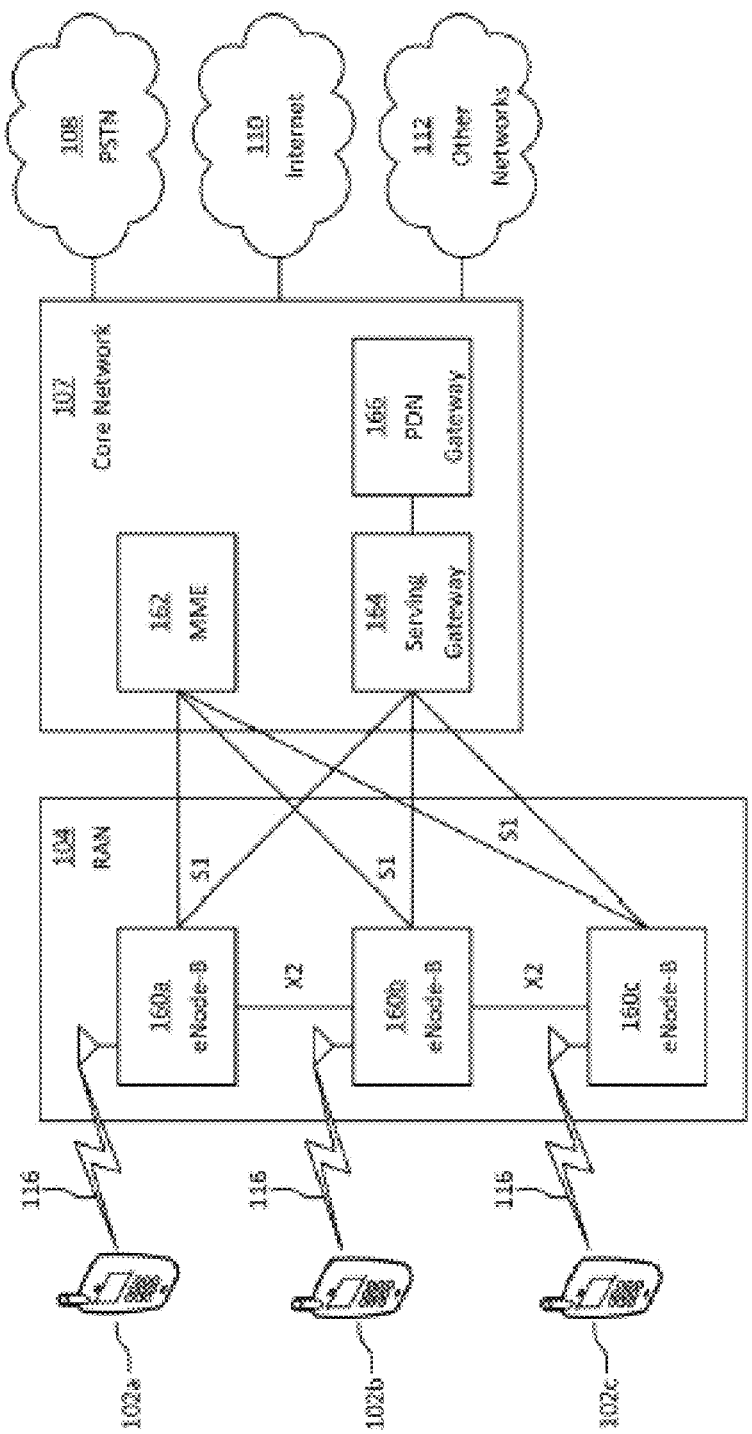
FIG. 1C is a system diagram that shows an example of a Radio Access Network (RAN) architecture and a core network architecture.

FIG. 1C is a system diagram of an example RAN 104 and core network 107. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, and 160c, though it will be appreciated that the RAN 104 may include any number of eNode-Bs. The eNode-Bs 160a, 160b, and 160c may each include one or more transceivers for communicating with the WTRUs 102a, 102b, and 102c over the air interface 116. For example, the eNode-Bs 160a, 160b, and 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink and/or downlink, and the like. As shown in FIG. 1C, the eNode-Bs 160a, 160b, and 160c may communicate with one another over an X2 interface.

The core network 107 shown in FIG. 1C may include a Mobility Management Gateway (MME) 162, a serving gateway 164, and a Packet Data Network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, and 102c, bearer activation/deactivation, selecting a particular serving gateway during an initial attach of the WTRUs 102a, 102b, and 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the S1 interface. The serving gateway 164 may generally route and forward user data packets to/from the WTRUs 102a, 102b, and 102c. The serving gateway 164 may also perform other functions, such as anchoring user planes during inter-eNode B handovers, triggering paging when downlink data is available for the WTRUs 102a, 102b, and 102c, managing and storing contexts of the WTRUs 102a, 102b, and 102c, and the like.

The serving gateway 164 may also be connected to the PDN gateway 166, which may provide the WTRUs 102a, 102b, and 102c with access to packet-switched networks, such as the Internet 110, to facilitate communications between the WTRUs 102a, 102b, 102c, and IP-enabled devices.

The core network 107 may facilitate communications with other networks. For example, the core network 107 may provide the WTRUs 102a, 102b, and 102c with access to circuit-switched networks, such as the PSTN 108, to facilitate communications between the WTRUs 102a, 102b, and 102c and traditional land-line communications devices. For example, the core network 107 may include, or may communicate with, an IP gateway (e.g., an IP Multimedia Subsystem (IMS) server) that serves as an interface between the core network 107 and the PSTN 108. In addition, the core network 107 may provide the WTRUs 102a, 102b, and 102c with access to the networks 112, which may include other wired or wireless networks that are owned and/or operated by other service providers.

Figure 1D:
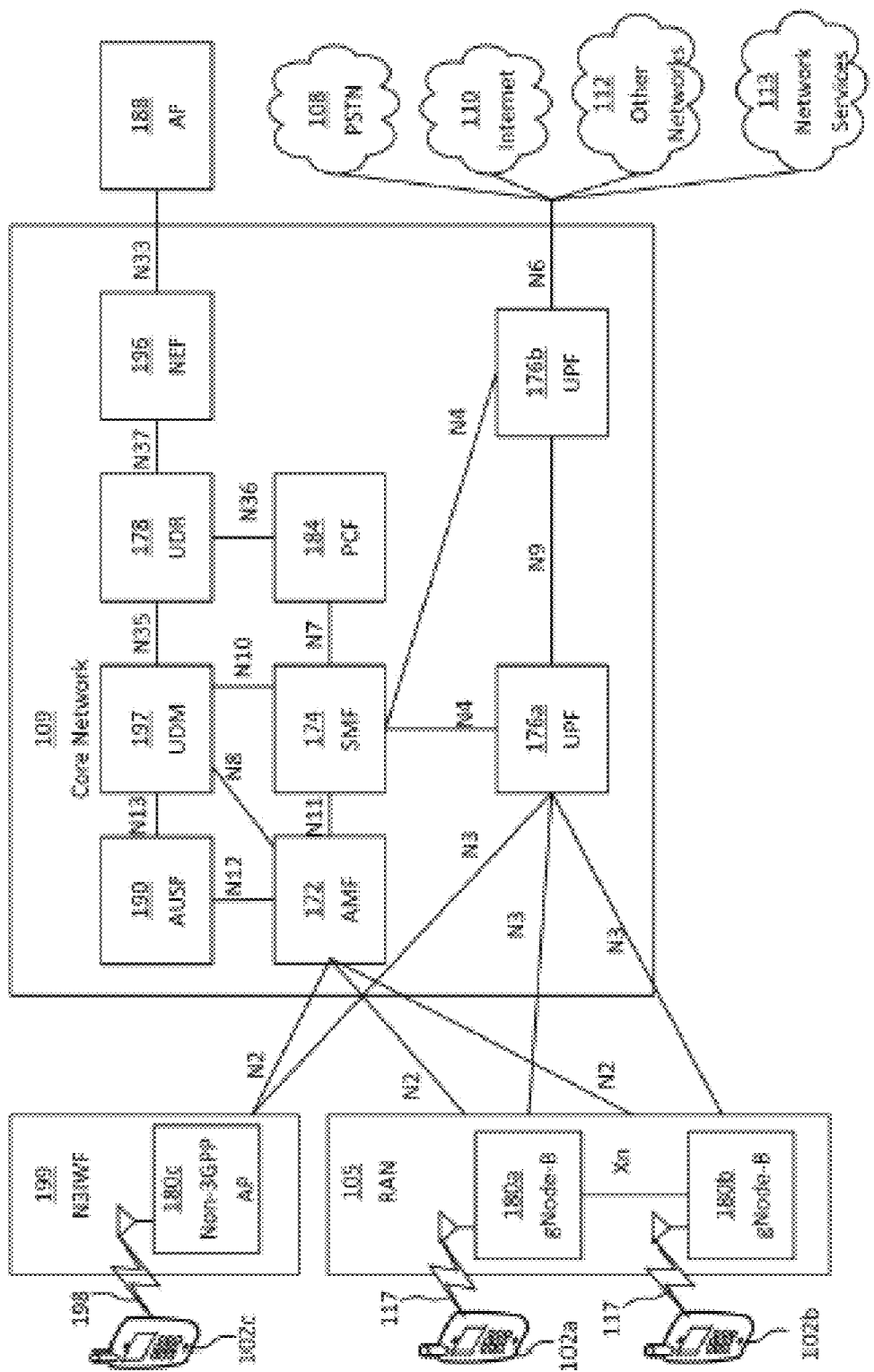
FIG. 1D is a system diagram that shows an example of a Radio Access Network (RAN) architecture and a core network architecture.

FIG. 1D is a system diagram of an example RAN 105 and core network 109. The RAN 105 may employ an NR radio technology to communicate with the WTRUs 102a and 102b over the air interface 117. The RAN 105 may also be in communication with the core network 109. A Non-3GPP Interworking Function (N3IWF) 199 may employ a non-3GPP radio technology to communicate with the WTRU 102c over the air interface 198. The N3IWF 199 may also be in communication with the core network 109.

The RAN 105 may include gNode-Bs 180a and 180b. It will be appreciated that the RAN 105 may include any number of gNode-Bs. The gNode-Bs 180a and 180b may each include one or more transceivers for communicating with the WTRUs 102a and 102b over the air interface 117. When integrated access and backhaul connection are used, the same air interface may be used between the WTRUs and gNode-Bs, which may be the core network 109 via one or multiple gNBs. The gNode-Bs 180a and 180b may implement MIMO, MU-MIMO, and/or digital beamforming technology. Thus, the gNode-B 180a, for example, may use multiple antennas to transmit wireless signals to, and receive wireless signals from, the WTRU 102a. It should be appreciated that the RAN 105 may employ other types of base stations such as an eNode-B. It will also be appreciated the RAN 105 may employ more than one type of base station. For example, the RAN may employ eNode-Bs and gNode-Bs.

The N3IWF 199 may include a non-3GPP Access Point 180c. It will be appreciated that the N3IWF 199 may include any number of non-3GPP Access Points. The non-3GPP Access Point 180c may include one or more transceivers for communicating with the WTRUs 102c over the air interface 198. The non-3GPP Access Point 180c may use the 802.11 protocol to communicate with the WTRU 102c over the air interface 198.

Each of the gNode-Bs 180a and 180b may be associated with a particular cell (not shown) and may be configured to handle radio resource management decisions, handover decisions, scheduling of users in the uplink and/or downlink, and the like. As shown in FIG. 1D, the gNode-Bs 180a and 180b may communicate with one another over an Xn interface, for example.

The core network 109 shown in FIG. 1D may be a 5G core network (5GC). The core network 109 may offer numerous communication services to customers who are interconnected by the radio access network. The core network 109 comprises a number of entities that perform the functionality of the core network. As used herein, the term "core network entity" or "network function" refers to any entity that performs one or more functionalities of a core network. It is understood that such core network entities may be logical entities that are implemented in the form of computer-executable instructions (software) stored in a memory of, and executing on a processor of, an apparatus configured for wireless and/or network communications or a computer system, such as system 90 illustrated in FIG. 1G.

In the example of FIG. 1D, the 5G Core Network 109 may include an access and mobility management function (AMF) 172, a Session Management Function (SMF) 174, User Plane Functions (UPFs) 176a and 176b, a User Data Management Function (UDM) 197, an Authentication Server Function (AUSF) 190, a Network Exposure Function (NEF) 196, a Policy Control Function (PCF) 184, a Non-3GPP Interworking Function (N3IWF) 199, a User Data Repository (UDR) 178. While each of the foregoing elements are depicted as part of the 5G core network 109, it will be appreciated that any one of these elements may be owned and/or operated by an entity other than the core network operator. It will also be appreciated that a 5G core network may not consist of all of these elements, may consist of additional elements, and may consist of multiple instances of each of these elements. FIG. 1D shows that network functions directly connect to one another, however, it should be appreciated that they may communicate via routing agents such as a diameter routing agent or message buses.

In the example of FIG. 1D, connectivity between network functions is achieved via a set of interfaces, or reference points. It will be appreciated that network functions could be modeled, described, or implemented as a set of services that are invoked, or called, by other network functions or services. Invocation of a Network Function service may be achieved via a direct connection between network functions, an exchange of messaging on a message bus, calling a software function, etc.

The AMF 172 may be connected to the RAN 105 via an N2 interface and may serve as a control node. For example, the AMF 172 may be responsible for registration management, connection management, reachability management, access authentication, access authorization. The AMF may be responsible for forwarding user plane tunnel configuration information to the RAN 105 via the N2 interface. The AMF 172 may receive the user plane tunnel configuration information from the SMF via an N11 interface. The AMF 172 may generally route and forward NAS packets to/from the WTRUs 102a, 102b, and 102c via an N1 interface. The N1 interface is not shown in FIG. 1D.

The SMF 174 may be connected to the AMF 172 via an N11 interface. Similarly, the SMF may be connected to the PCF 184 via an N7 interface, and to the UPFs 176a and 176b via an N4 interface. The SMF 174 may serve as a control node. For example, the SMF 174 may be responsible for Session Management, IP address allocation for the WTRUs 102a, 102b, and 102c, management and configuration of traffic steering rules in the UPF 176a and UPF 176b, and generation of downlink data notifications to the AMF 172.

The UPF 176a and UPF 176b may provide the WTRUs 102a, 102b, and 102c with access to a Packet Data Network (PDN), such as the Internet 110, to facilitate communications between the WTRUs 102a, 102b, and 102c and other devices. The UPF 176a and UPF 176b may also provide the WTRUs 102a, 102b, and 102c with access to other types of packet data networks. For example, Other Networks 112 may be Ethernet Networks or any type of network that exchanges packets of data. The UPF 176a and UPF 176b may receive traffic steering rules from the SMF 174 via the N4 interface. The UPF 176a and UPF 176b may provide access to a packet data network by connecting a packet data network with an N6 interface or by connecting to each other and to other UPFs via an N9 interface. In addition to providing access to packet data networks, the UPF 176 may be responsible for packet routing and forwarding, policy rule enforcement, quality of service handling for user plane traffic, downlink packet buffering.

The AMF 172 may also be connected to the N3IWF 199, for example, via an N2 interface. The N3IWF facilitates a connection between the WTRU 102c and the 5G core network 170, for example, via radio interface technologies that are not defined by 3GPP. The AMF may interact with the N3IWF 199 in the same, or similar, manner that it interacts with the RAN 105.

The PCF 184 may be connected to the SMF 174 via an N7 interface, connected to the AMF 172 via an N15 interface, and to an Application Function (AF) 188 via an N5 interface. The N15 and N5 interfaces are not shown in FIG. 1D. The PCF 184 may provide policy rules to control plane nodes such as the AMF 172 and SMF 174, allowing the control plane nodes to enforce these rules. The PCF 184, may send policies to the AMF 172 for the WTRUs 102a, 102b, and 102c so that the AMF may deliver the policies to the WTRUs 102a, 102b, and 102c via an N1 interface. Policies may then be enforced, or applied, at the WTRUs 102a, 102b, and 102c.

The UDR 178 may act as a repository for authentication credentials and subscription information. The UDR may connect to network functions, so that network function can add to, read from, and modify the data that is in the repository. For example, the UDR 178 may connect to the PCF 184 via an N36 interface. Similarly, the UDR 178 may connect to the NEF 196 via an N37 interface, and the UDR 178 may connect to the UDM 197 via an N35 interface.

The UDM 197 may serve as an interface between the UDR 178 and other network functions. The UDM 197 may authorize network functions to access of the UDR 178. For example, the UDM 197 may connect to the AMF 172 via an N8 interface, the UDM 197 may connect to the SMF 174 via an N10 interface. Similarly, the UDM 197 may connect to the AUSF 190 via an N13 interface. The UDR 178 and UDM 197 may be tightly integrated.

The AUSF 190 performs authentication related operations and connects to the UDM 178 via an N13 interface and to the AMF 172 via an N12 interface.

The NEF 196 exposes capabilities and services in the 5G core network 109 to Application Functions (AF) 188. Exposure may occur on the N33 API interface. The NEF may connect to an AF 188 via an N33 interface and it may connect to other network functions in order to expose the capabilities and services of the 5G core network 109.

Application Functions 188 may interact with network functions in the 5G Core Network 109. Interaction between the Application Functions 188 and network functions may be via a direct interface or may occur via the NEF 196. The Application Functions 188 may be considered part of the 5G Core Network 109 or may be external to the 5G Core Network 109 and deployed by enterprises that have a business relationship with the mobile network operator.

Network Slicing is a mechanism that could be used by mobile network operators to support one or more 'virtual' core networks behind the operator's air interface. This involves 'slicing' the core network into one or more virtual networks to support different RANs or different service types running across a single RAN. Network slicing enables the operator to create networks customized to provide optimized solutions for different market scenarios which demands diverse requirements, e.g. in the areas of functionality, performance and isolation.

3GPP has designed the 5G core network to support Network Slicing. Network Slicing is a good tool that network operators can use to support the diverse set of 5G use cases (e.g., massive IoT, critical communications, V2X, and enhanced mobile broadband) which demand very diverse and sometimes extreme requirements. Without the use of network slicing techniques, it is likely that the network architecture would not be flexible and scalable enough to efficiently support a wider range of use cases need when each use case has its own specific set of performance, scalability, and availability requirements. Furthermore, introduction of new network services should be made more efficient.

Referring again to FIG. 1D, in a network slicing scenario, a WTRU 102a, 102b, or 102c may connect to an AMF 172, via an N1 interface. The AMF may be logically part of one or more slices. The AMF may coordinate the connection or communication of WTRU 102a, 102b, or 102c with one or more UPF 176a and 176b, SMF 174, and other network functions. Each of the UPFs 176a and 176b, SMF 174, and other network functions may be part of the same slice or different slices. When they are part of different slices, they may be isolated from each other in the sense that they may utilize different computing resources, security credentials, etc.

The core network 109 may facilitate communications with other networks. For example, the core network 109 may include, or may communicate with, an IP gateway, such as an IP Multimedia Subsystem (IMS) server, that serves as an interface between the 5G core network 109 and a PSTN 108. For example, the core network 109 may include, or communicate with a short message service (SMS) service center that facilities communication via the short message service. For example, the 5G core network 109 may facilitate the exchange of non-IP data packets between the WTRUs 102a, 102b, and 102c and servers or applications functions 188. In addition, the core network 170 may provide the WTRUs 102a, 102b, and 102c with access to the networks 112, which may include other wired or wireless networks that are owned and/or operated by other service providers.

The core network entities described herein and illustrated in FIGS. 1A, 1C, 1D, and 1E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIGS. 1A, 1B, 1C, 1D, and 1E are provided by way of example only, and it is understood that the subject matter disclosed and claimed herein may be embodied or implemented in any similar communication system, whether presently defined or defined in the future.

Figure 1E:
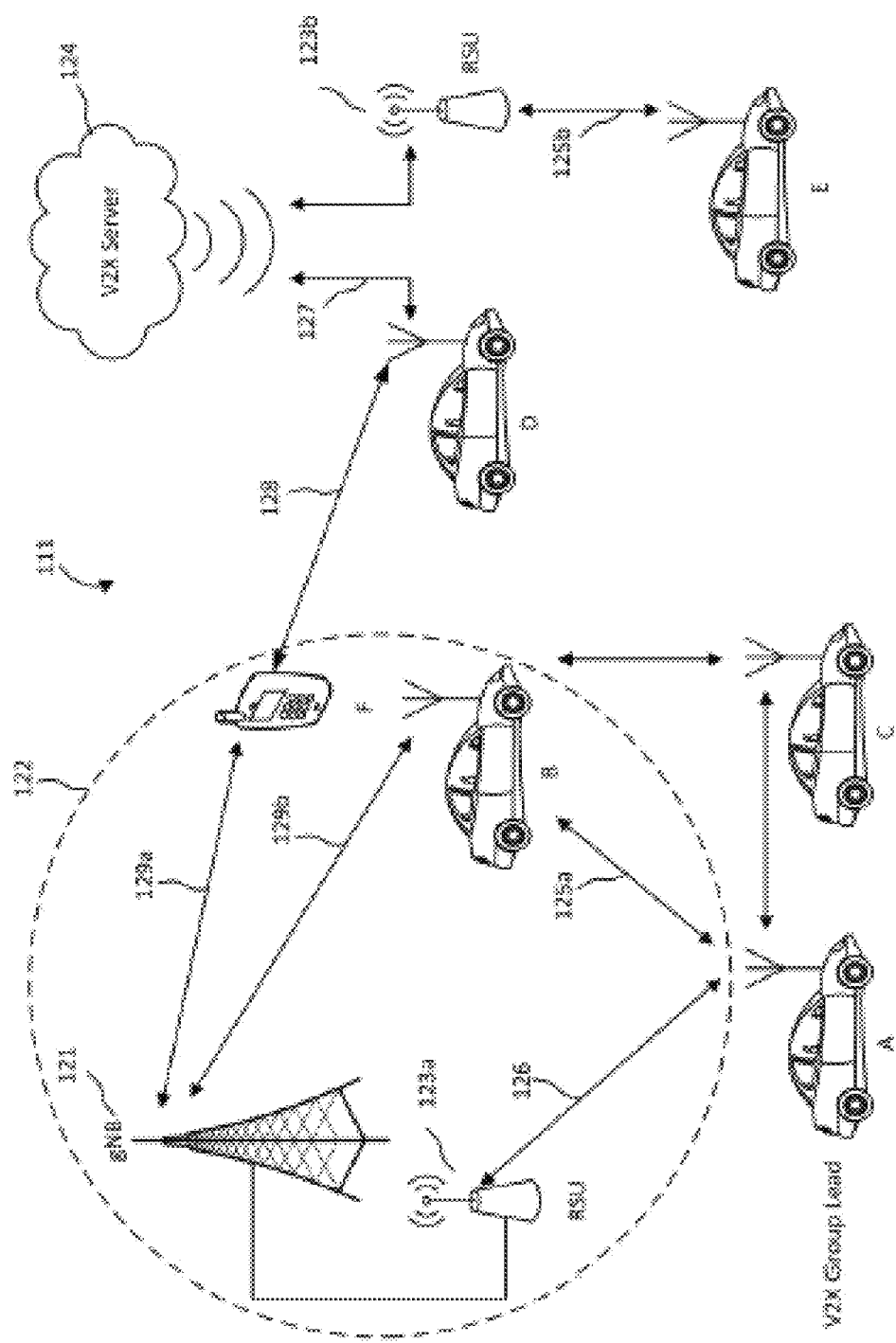
FIG. 1E is a system diagram that shows an example 3GPP architecture.

FIG. 1E illustrates an example communications system 111 in which the systems, methods, apparatuses described herein may be used. Communications system 111 may include Wireless Transmit/Receive Units (WTRUs) A, B, C, D, E, F, a base station gNB 121, a V2X server 124, and Road Side Units (RSUs) 123a and 123b. In practice, the concepts presented herein may be applied to any number of WTRUs, base station gNBs, V2X networks, and/or other network elements. One or several or all WTRUs A, B, C, D, E, and F may be out of range of the access network coverage 122. WTRUs A, B, and C form a V2X group, among which WTRU A is the group lead and WTRUs B and C are group members.

WTRUs A, B, C, D, E, F may communicate with each other over a Uu interface 129b via the gNB 121 if they are under the access network coverage (only B and F are shown under the network coverage in FIG. 1E). WTRUs A, B, C, D, E, F may communicate with each other directly via a Sidelink (PC5 or NR PC5) interface 125 a, 125b, 128, if they are under or out of the access network coverage (e.g., A, C, WTRUs A, B, C, D, E, F may communicate with each other D and E are shown out of the network coverage in FIG. 1E).

WTRUs A, B, C, D, E, and F may communicate with RSU 123a or 123b via a Vehicle-to-Network (V2N) 126 or Sidelink interface 125b. WTRUs A, B, C, D, E, and F may communicate to a V2X Server 124 via a Vehicle-to-Infrastructure (V2I) interface 127. WTRUs A, B, C, D, E, and F may communicate to another UE via a Vehicle-to-Person (V2P) interface 128.

Figure 1F:
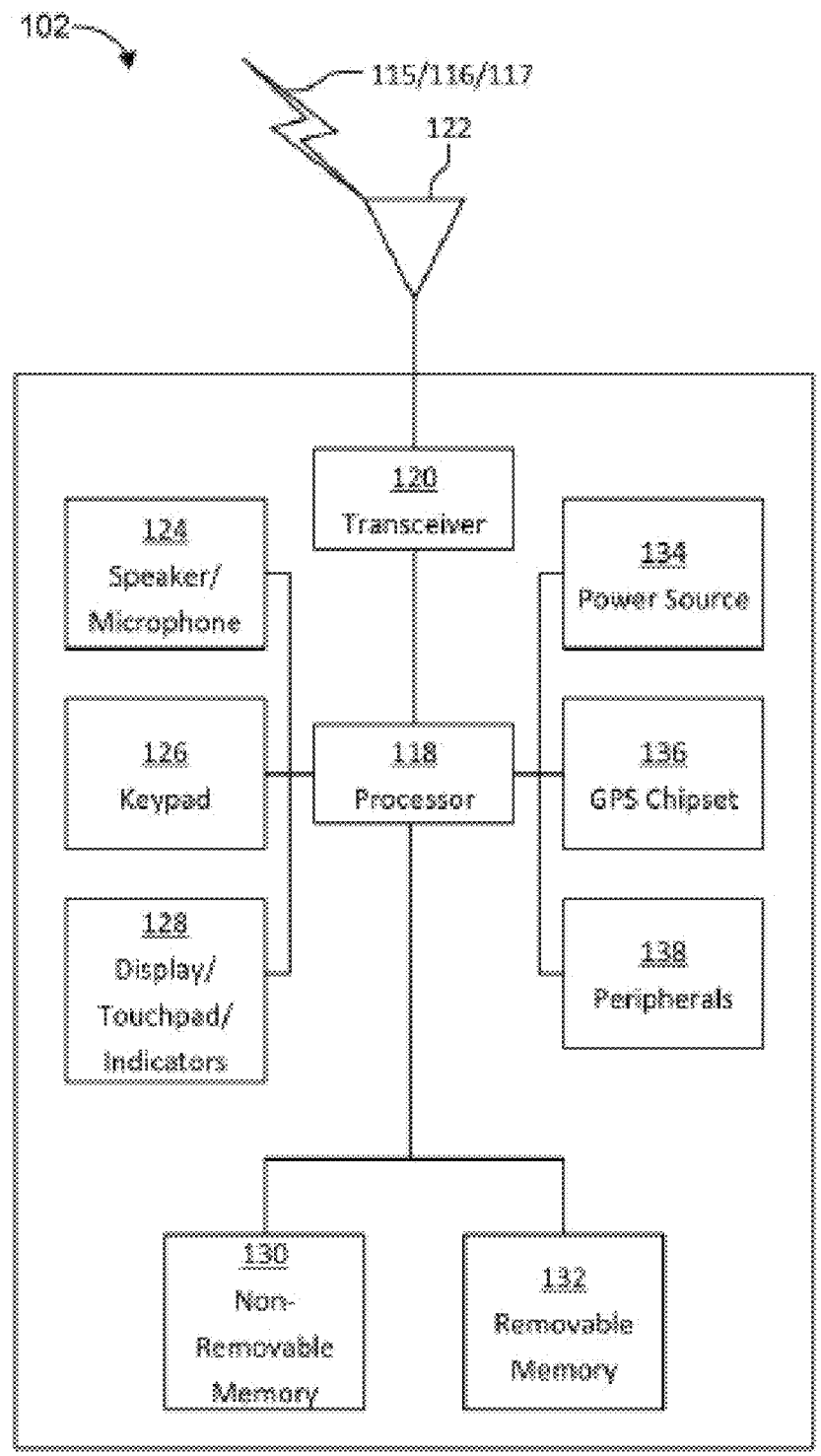
FIG. 1F is a system diagram of an example apparatus or device configured for wireless communications.

FIG. 1F is a block diagram of an example apparatus or device WTRU 102 that may be configured for wireless communications and operations in accordance with the systems, methods, and apparatuses described herein, such as a WTRU 102 of FIG. 1A, 1B, 1C, 1D, or 1E. As shown in FIG. 1F, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any subcombination of the foregoing elements. Also, the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, a next generation node-B (gNode-B), and proxy nodes, among others, may include some or all of the elements depicted in FIG. 1F and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1F depicts the processor 118 and the transceiver 120 as separate components, it will be appreciated that the processor 118 and the transceiver 120 may be integrated together in an electronic package or chip.

The transmit/receive element 122 of a UE may be configured to transmit signals to, or receive signals from, a base station (e.g., the base station 114a of FIG. 1A) over the air interface 115/116/117 or another UE over the air interface 115d/116d/117d. For example, the transmit/receive element 122 may be an antenna configured to transmit and/or receive RF signals. The transmit/receive element 122 may be an emitter/detector configured to transmit and/or receive IR, UV, or visible light signals, for example. The transmit/receive element 122 may be configured to transmit and receive both RF and light signals. It will be appreciated that the transmit/receive element 122 may be configured to transmit and/or receive any combination of wireless or wired signals.

In addition, although the transmit/receive element 122 is depicted in FIG. 1F as a single element, the WTRU 102 may include any number of transmit/receive elements 122. More specifically, the WTRU 102 may employ MIMO technology. Thus, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, for example NR and IEEE 802.11 or NR and E-UTRA, or to communicate with the same RAT via multiple beams to different RRHs, TRPs, RSUs, or nodes.

The processor 118 of the WTRU 102 may be coupled to, and may receive user input data from, the speaker/microphone 124, the keypad 126, and/or the display/touchpad/indicators 128 (e.g., a liquid crystal display (LCD) display unit or organic light-emitting diode (OLED) display unit. The processor 118 may also output user data to the speaker/microphone 124, the keypad 126, and/or the display/touchpad/indicators 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. The processor 118 may access information from, and store data in, memory that is not physically located on the WTRU 102, such as on a server that is hosted in the cloud or in an edge computing platform or in a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method.

The processor 118 may further be coupled to other peripherals 138, which may include one or more software and/or hardware modules that provide additional features, functionality, and/or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be included in other apparatuses or devices, such as a sensor, consumer electronics, a wearable device such as a smart watch or smart clothing, a medical or eHealth device, a robot, industrial equipment, a drone, a vehicle such as a car, truck, train, or an airplane. The WTRU 102 may connect to other components, modules, or systems of such apparatuses or devices via one or more interconnect interfaces, such as an interconnect interface that may comprise one of the peripherals 138.

Figure 1G:
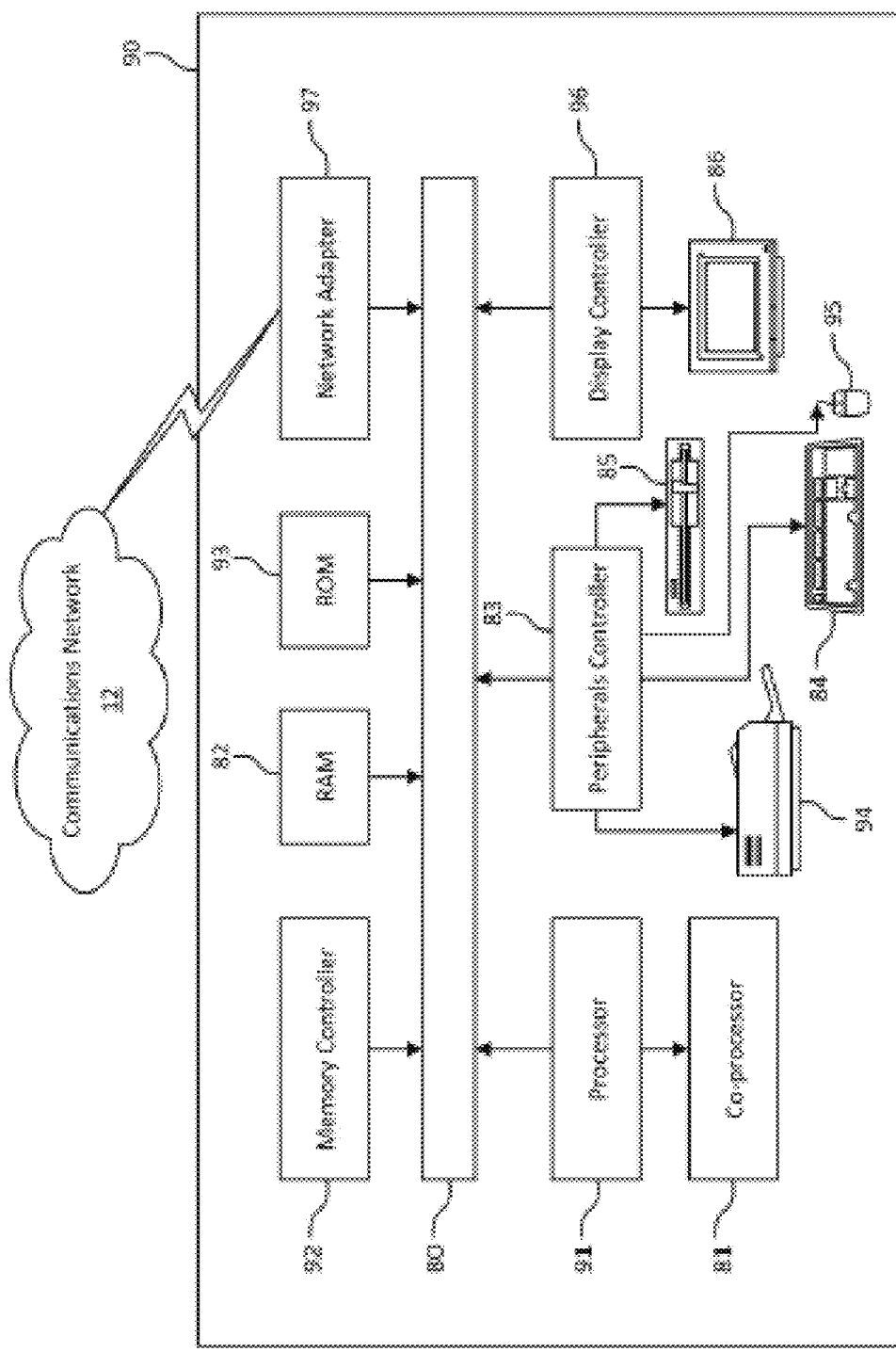
FIG. 1G is a system diagram that shows an example of a computing system used in a communication network.

FIG. 1G is a block diagram of an exemplary computing system 90 in which one or more apparatuses of the communications networks illustrated in FIGS. 1A, 1C, 1D and 1E may be embodied, such as certain nodes or functional entities in the RAN 103/104/105, Core Network 106/107/109, PSTN 108, Internet 110, Other Networks 112, or Network Services 113. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, and/or any other functionality that enables the computing system 90 to operate in a communications network. Coprocessor 81 is an optional processor, distinct from main processor 91, that may perform additional functions or assist processor 91. Processor 91 and/or coprocessor 81 may receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by processor 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a wireless or wired network adapter 97, that may be used to connect computing system 90 to an external communications network or devices, such as the RAN 103/104/105, Core Network 106/107/109, PSTN 108, Internet 110, WTRUs 102, or Other Networks 112 of FIGS. 1A, 1B, 1C, 1D, and 1E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform and/or implement the systems, methods and processes described herein. Specifically, any of the steps, operations, or functions described herein may be implemented in the form of such computer executable instructions, executing on the processor of an apparatus or computing system configured for wireless and/or wired network communications. Computer readable storage media includes volatile and nonvolatile, removable and non-removable media implemented in any non-transitory (e.g., tangible or physical) method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computing system.

As an overview, the systems and methods described herein present approaches for enabling spectrum sharing or sub-licensing between at least two commercial users, at least one of whom has primary license rights to certain specified RF spectrum for use in communications services. The main components of the system include some or all of spectrum manager 220, database server 225, network controller 230, license manager 201, radio devices 214, access points or radio base-stations 206, and RF sensors. The sub-licensing scheme of this disclosure, and by extension the enablement of third-party micro-operator described herein as an operator of a network who acquires spectrum sub-license rights and further deploys networked radio devices capable of operating on this sub-licensed spectrum, presents certain tangible benefits to both the primary licensor and the micro-operator. For the primary licensor, the spectrum sublicensing presents potential new revenue from the sublicensing of its spectrum asset without the cost of the installation of dedicated radio devices or build out of the related network. For the micro-operators, the sub-licensing presents a way to enable wireless connectivity in congestion-free spectrum if the sublicense policy ensures that the micro-operator is authorized to operate on the sub-licensed spectrum within the micro-operator network range.

FIG. 2 depicts an exemplary system network in which a primary license owner (such as a mobile network operator) sublicenses spectrum to regional micro-operators. The system comprises elements of a software-defined network with virtualized elements to enable interfacing with an operator network, such as a mobile operator network or fixed wireless access network that is under the control of the primary spectrum license rights holder. This enables delineation of the system elements into an application layer 205, a control layer 210, and an infrastructure/vendor layer 215. The spectrum manager 204 is a virtualized function that exists in the control layer 210 or vendor/infrastructure layer 215 operating under a policy agreed with the network operator who has primary license rights to the spectrum. Functionally, the system enables a primary spectrum license owner to apportion a spectrum asset by sub-licensing some or all of this spectrum to one or more wireless networks within the geo-domain of its primary license. In this embodiment, the spectrum manager 204 is a trusted application that sits in in the control layer 210, whose primary function is to administer the spectrum sublicense as a component of, or in cooperation with, the access and mobility management function such as in the 3GPP specifications, and to ensure only trusted third party micro-operators obtain the sub-license, and then comply with the sub-license. In another embodiment, the spectrum manager 204 can also initially be a third-party application that goes through a verification process where-after it becomes a trusted constituent of the control plane of the 3GPP system. A micro-operator deploys the gNB (which we variously term hereafter a radio device, or access point) or next generation radio access network NG-RAN, comprising multiple interconnected gNBs, in 5G terminology.

System 200, being the system elements within the user/vendor layer and comprising a primary spectrum manager 204, includes one or more radio network devices 206 capable of emitting RF in a specified licensed spectrum band or bands within a defined geo-location, in a pre-defined or otherwise determinable radiation pattern (by the radio, or the micro-operator), an optional spectrum sensor or sensors characterizing aspects such as RF frequency and power in a defined geolocation, and a database server 225 and license manager 201. The database server 225 contains a persistent record of the primary spectrum license obtained from the responsible governmental agency that granted the license, including information such as the spectrum range and channel reference within that range, and the geolocations permissible under said license and such other terms as may be further prescribed by the license. The database server 225 and license manager 201 are applications or logical entities that enable the spectrum manager 204 to implement and administer multiple licensing schemes and multiple user policies concurrently to multiple micro-operators in respect of the relevant spectrum. These aspects are shown in FIG. 2 as part of a Unified Data Control function 209 comprising multiple aspects of control under the 3GPP framework such as the Policy Control Function, Authentication Server Function and Unified Data Management function, but could equally be components or application containers within the spectrum manager, particularly if the spectrum manager is a third-party application. The system also includes an Application Function 255 and Additional Control Functions 260, which may be located at the application layer 205 or the control later 210.

The spectrum manager 204 is capable of being polled by or receiving requests from radio devices 206 or by the network controller 230 which may be part of a micro-operator network as denoted below. The network controller 230 communicates with the spectrum manager 204 in order to establish a formal sub-licensing policy, under which radio devices 206 within its own network can be operated on a portion or portions of the spectrum that is administered by the spectrum manager. In one embodiment the network controller cedes some control of said radio devices 206 to the spectrum manager 204. In another embodiment, the network controller 230 administers the agreed sub-licensing policy, without ceding control of the radio devices 206.

A party obtaining or using a spectrum sub-license for one or more radio devices on this sub-licensed spectrum shall be termed herein a micro-operator 214, who could also be a network administrator of the network controller 230 to provide services to the end user device termed a UE within its geo-region. The parameters of the spectrum sub-license agreed between parties can be uploaded to the spectrum manager 204 and may include specifics such as how the spectrum may be utilized temporally and geographically within defined geographic coordinates such as latitude, longitude and elevation, by micro-operator 214. Micro-operators in this context include, for example, private enterprise networks deployed in multiple tenancy commercial buildings, with multiple floors, or with large coverage area, or both; fixed wireless internet service providers provisioning wireless connectivity in urban, semi-urban or rural environments, but can be any other wireless operator service that could utilize the spectrum under a sub-license. It should be understood that the primary licensor, being in one embodiment the mobile network operator, can operate alongside the micro-operator being the sub-licensor, in a defined geo-region by establishing a suitable sublicense policy between both parties for mutual co-existence.

Key aspects of the method disclosed herein include: enabling the spectrum manager 204 to administer the spectrum in a manner that permits a temporally-defined sub-license within a defined geo-location to specific radio emitters 206, where the sub-license governs the agreed circumstances under which radio devices 206 can operate on this sub-licensed spectrum; the radio network device 206 is able to obtain operating parameters from the spectrum manager to permit its activation and the spectrum manager can deactivate the radio device 206 if it does not operate within such policy parameters. Generally, the policy parameters of the sub-license shall not conflict with the parameters of the primary spectrum license, as would for example be the circumstance if the radio network device 206 was authorized and controlled by the primary licensor itself. Radio device 206 is configurable in such manner as to comply with the sub-license, including but not limited to controlling RF parameters such as but not limited to equivalent isotopically radiated power (EIRP) and antenna array gain.

Mobile network operators (MNO) are one class of primary spectrum owner who may desire to sub-license spectrum to third party micro-operators. To date MNOs have generally built out for example 3G and 4G/LTE cellular networks using sub-2 GHz spectrum. However, forthcoming 5G networks may utilize other frequency bands in addition to the sub-2 GHz bands that predominate through to 4G & LTE. In a preferred embodiment, the sub-licensed spectrum administered by the spectrum manager in the system 200 is millimeter wave (mmWave) spectrum. Millimeter wave RF by its nature has high path loss, and thus a lesser communications link range than mid-band RF, or low-band RF spectrum (sub-6 GHz) if the comparison is made with substantially all other RF characteristics being similar. As such, communications radio devices operating on the millimeter wave bands have significantly lower potential to interfere with other radio devices of the same RF spectrum as they are more likely fall outside the physical range at which interference has a deleterious impact on communication link fidelity. Such microwave spectrum "hotspots" could be deployed for example in a private setting, particularly using sub-2 GHz frequencies, as a small cell—being a cellular radio device of lesser range and power than macro-cells or micro-cells operating on the same frequency, and both the small cell and the macro-cell being controlled by the mobile network operator.

The term micro-operator, in the context of this disclosure, can further mean the operator or manager of a discrete local area network (LAN), or an operator of a wide area network (WAN), or some other type of network wherein the network or radio access network under micro-operator management employs one or more radio devices 206 that are incorporated in either composite access points employing at least one other radio technology such as but not limited to WiFi, or otherwise radio devices existing in dedicated but unincorporated units that can operate on the sub-licensed spectrum. The radio device 206 may itself be a discrete radio unit or alternatively be a radio device incorporated in an access point device together with other radios that operate wireless spectrum either licensed or unlicensed that may not be controlled and administered by the spectrum manager 204. Such a multi-radio access point allows micro-operators to set up networks that can co-mingle wireless services and radio technology types. It is notable that these micro-operator network radio devices 206 are distinguished from small cells, which are effectively viewed as radio extensions of a mobile network operator MNO network (the MNO being also the primary spectrum license owner), and are not independently managed by the type of independent micro-operator who merely has a spectrum sublicense to operate. Small cell networks are therefore distinguished from the micro-operator network type of this disclosure, in that the former requires some control and administration by the mobile network operator without a spectrum sub-license, whereas the latter is a network operated under a spectrum sub-license which may or may not be from an MNO.

The spectrum manager 204 can be polled by or alternatively polls radio devices 206 to ascertain the state of compliance of radio device 206 with the spectrum license policy to be administered by the spectrum manager 204. Signaling and information requests to authorize activation of a radio device 206 or to present its status data to the spectrum manager are transited over a communications link between the spectrum manager 204 and the radio device 206. This communications link may be provided by a wireless or wired connection, on service provider networks and include the public internet, or be wholly part of a private network such as a LAN, or a composite of multiple private networks, and be of many communication link types depending on where the spectrum manager 204 is sited in relation to the radio device 206. In one embodiment the spectrum manager 204 exists in the cloud and enables multiple geographically-dispersed networks of radio devices to be activated and policed, and separately configured by a plurality of micro-operators. In another embodiment the spectrum manager 204 may be co-sited with a premises gateway unit or in an edge-controller unit of a micro-operator network 214, or beyond the gateway within a private network environment Network slicing is a 5G system architecture services function 250 that enables the multiplexing of virtualized and independent logical networks on a common physical network structure. The spectrum manager 204 has network-Tide policy information as well as visibility of the entire underlying network elements including up to the last node in the user network, the radios 206 themselves, Using this information, the micro operator 214 will be able to initiate and establish network slicing seamlessly from end-end, or alternatively the spectrum manager 204 can initiate and establish network slicing from end-end upon the request of the primary licensor.

Examples of network situations that would benefit from system 200 generally include: multi-level buildings, large campuses, and enterprise settings deploying fixed radio access network infrastructure. The geo-location information of specific radios 206 may include three dimensional spatial coordinates, including latitude, longitude and elevation, enabling multiple spectrum reuse possibilities, especially for millimeter spectrum RF in multi-level multi-tenant high rise buildings with multiple micro-operators. For example, a millimeter wave licensor could sublicense a portion of the millimeter wave spectrum to a fifty floor multi-tenancy skyscraper fifty times or more. System 200 may also find utility in temporary micro-operator networks with high user density, and high throughput requirements, for example for festivals and sporting events, stadia, grandstands, and the like.

An exemplary signaling scheme for the establishment and operation of system 200 is as follows. The micro-operator 214 sub-license commences with a request from the micro-operator to the spectrum manager. Upon receiving said request the spectrum manager 204 authenticates the radio(s) 206, and its capabilities with reference to the database manager 220 which contains up to date information with respect to each radio, its capability, and its configuration, pre-approved to operate under sub-license. The radio devices 206 are verifiable as authentic by the spectrum manager by accessing unique characteristics such as, but not limited to, the media access control number, the IP address, and comparing it to the database record. Next, the spectrum manager ascertains desired configuration parameters for the radio(s) from the micro-operator, which are to form part of the operating parameters of the sub-license. The configuration parameters may be specified with or by a network device such as an edge controller unit, a wireless gateway unit, that performs the primary network administration and control function of the micro-operator network. Such parameters may include, the geolocation of discrete radios, EIRP, antenna array gain, radiated power, and the configurability and capability of each of the radios, their arrangement in an access point, and the antenna front ends connected to the radios through which RF is generated or received. The spectrum manager ascertains whether the sub-license requested complies with applicable regulatory requirement and any sub-license pre-agreed with the micro-operator, after which the spectrum manager approves or disproves the sub-license, or electronically agrees a new sub-license with the micro-operator. The temporal term of the sub-license may itself be a component of the sub-license, as would be the geo-location of radios subject to the sublicense. The sub-license further includes all relevant parameters some or all of which are subject to verification, audit or approval, by the spectrum manager or by extension, the primary license holder.

For the system 200 to be utilized in this manner, licensor and sub-licensor parties need to have confidence that the sub-license is obtainable and once obtained is enforceable and auditable by the spectrum licensor, preferentially in near-real time. A commercial framework for the sub-license could consist of billing and accounting compensation linked to measured or assignable parameters such as the air time usage of the activated radios, the actual bandwidth assigned to the radios, which may be a portion of the sub-licensable spectrum, the cumulative data capacity transited over the sub-licensed spectrum, the number of radios, and the like. Once registered by the spectrum manager the micro-operator controller submits paramount control of the activation and deactivation of the radios 206 to the spectrum manager. The micro-operator may submit preferred operating configurations to the spectrum manager 204, which can then ascertain the compliance of such requests with the sub-licensing policy it administers and to which the micro-operator is bound. This verification, audit, or approval as the case is, may occur in real-time, and form part of the control and signaling under which the micro-operator and the radios are subject to the spectrum manager's authority or approval for radio emissions on the sub-licensed spectrum. Any modification of such applicable parameters of the radios and their utility in network radio devices of the micro-operator network would be subject to further approval by the spectrum manager, and such approval may be provided in real-time. If the network radio or micro-operator seeks to depart or actually does depart from the agreed sub-license terms, the sub-license is subject to revocation in whole or in part according to the agreed policy. Applicable parameters subject to monitoring and control in this context could include, without limitation, RF aspects such as EIRP, radio frequency, and physical aspects such as geo-location, or RF confinement by signal strength to defined area or geo-fence region. Some or all these parameters may be monitored by sensors discrete or embedded sensors that may be incorporated into the micro-operator network within its geo-region, which can include means to sense and characterize physical parameters such as frequency spectrum, RF strength, direction of signal arrival, and the like.

In a further embodiment, radio 206 incorporates a software-defined radio rather than traditional hardware radio. A software defined radio operates by substituting one or more hardware elements in a traditional radio that are traditionally implemented in hardware and are instead implemented by software in a computerized or embedded system, such as that disclosed in reference to FIG. 1F. The advantage of the software defined radio rather than a dedicated radio that is tied to one protocol and one radio specification, is that that the software defined radio can receive and transmit widely different radio protocols based solely on the software used, and at different frequencies, limited in RF terms by the bandwidth of the RF front end including the antenna capability. If the system 200 described herein incorporates software defined radio as an alternative to a traditional radio, the radio can be frequency tuned within the sublicensed spectrum, and can be alternately configured to conform to the small cell radio specifications of one or more than one mobile network operators, either alternately, or concurrently. For example, the radio 130 could be configured, in the system, to operate on frequency X GHz of mobile operator A, or alternately on frequency Y GHz of mobile operator B, or run both radio specifications concurrently if there is sufficient processing bandwidth, and the RF signals can be sufficiently isolated. In this disclosure, software defined radio should be deemed to be an alternative to the radio, wherever the latter is referenced.

In a further embodiment as shown in FIG. 3, the system of FIG. 2 can convert from a micro-operator network to a small cell network by, amongst other changes to associated logical entities such as license/database manager, the spectrum manager being subsumed into the application layer 205 on the application/service provider side, rather than existing as a virtualized network function in the control layer 210 or the infrastructure/vendor side 215, or otherwise become the 5G Access & Mobility Function 305 which together with the Session Manager 300, can instantiate small cell control of gNBs. In one embodiment, the process commences by the small cell network sending an initial request to the spectrum manager. The spectrum manager upon receiving the request will make the necessary changes to the underlying network elements such as database manager, license manager, network controller, radio devices etc. for the new operational mode of the network. Once the relevant network wide changes are completed, the spectrum manager sends a completion message to the service provider network. Upon receiving this message, the service provider network will then subsume the spectrum manager into Access & Mobility Management Function 305 and operate the micro operator network as a small cell extension of its mobile operator network accordingly.

Alternatively, in a further embodiment, a small cell network can convert in whole or in part to a micro-operator network. The process commences by a micro-operator submitting a request to the mobile network operator, that specified small cells are desired to be devolved from the control of the mobile network operator and be assumed under the control of the micro-operator, under a spectrum sub-license. The spectrum manager after being devolved from the application layer can exist as a virtualized application that resides in the network control layer, or the vendor/application side, which may include the cloud, or an edge controller unit of an edge cloud, or in a gateway unit that interfaces to the micro-operator network.

FIG. 4 is a flow chart disclosing a method performed by the spectrum manager 204 for sublicensing spectrum to an access point or radio according to the present disclosure. The process begins with the spectrum manager 204 establishing sublicense terms and policy with the primary licensor at specific geolocations (S400). The spectrum manager then receives a request from Micro-Operator for specific AP/radio approval to operate on specific spectrum in specific geolocation of AP/radio (S405). Specifically, the micro-operator may submit preferred operating configurations to the spectrum manager 204, which can then ascertain the compliance of such requests with the sub-licensing policy it administers and to which the micro-operator is bound. This verification, audit, or approval as the case is, may occur in real-time, and form part of the control and signaling under which the micro-operator and the radios are subject to the spectrum manager's authority or approval for radio emissions on the sub-licensed spectrum. In S410 the spectrum manager 204 authenticates an identity of an AP/radio as being approvable for a sublicense. For example, upon receiving said request the spectrum manager 204 authenticates the radio(s) 206, and its capabilities with reference to the database manager 220 which contains up to date information with respect to each radio, its capability, and its configuration, pre-approved to operate under sub-license. At step S420 the spectrum manager 204 determines the identity of primary licensor of spectrum at a specific geolocation of authenticated radio(s) 206. The radio devices 206 are verifiable as authentic by the spectrum manager 204 by accessing unique characteristics such as, but not limited to, the media access control number, the IP address, and comparing it to the database record. In step S425 the spectrum manager 204 polls the database server 225 and license manager 201 associated with primary licensor and at S430 determines desired operating parameters of the radio(s) 206 in accordance with terms of the spectrum sublicense. The spectrum manager 204 ascertains desired configuration parameters for the radio(s) 206, which are to form part of the operating parameters of the sub-license. The configuration parameters may be specified with or by a network device such as an edge controller unit, a wireless gateway unit, that performs the primary network administration and control function of the micro-operator network. Such parameters may include, the geolocation of discrete radios, EIRP, antenna array gain, radiated power, and the configurability and capability of each of the radios, their arrangement in an access point, and the antenna front ends connected to the radios through which RF is generated or received. The spectrum manager ascertains whether the sub-license requested complies with applicable regulatory requirement and any sub-license pre-agreed with the micro-operator, after which the spectrum manager approves or disproves the sub-license, or electronically agrees a new sub-license with the micro-operator. The temporal term of the sub-license may itself be a component of the sub-license, as would be the geo-location of radios subject to the sublicense. The sub-license further includes all relevant parameters some or all of which are subject to verification, audit, or approval, by the spectrum manager or by extension, the primary license holder. At S435, the spectrum manager 204 transmits the sublicense operating parameters to the radio(s) 206. And then, at S440, the radio(s) 206 are configured to operate in accordance with parameters of the spectrum sublicense, and at S445 the radio(s) 206 is activated and commences RF operations. Once the radio(s) 206 are configured and activated, at S450 the spectrum manager 204 polls one or more of the micro-operator 214, radio(s) 206, available RF sensors within the micro-operator network to determine compliance with the sub-license (S455). In the event that it is determined that the radio(s) 206 is not operating in compliant with the sub-license (No in S455), the radio(s) 206 is deactivated (S460) and the sub-license is revoked (S465). In the event that it is determined that the radio(s) 206 is operating in compliant with the sub-license (Yes in S455), the radio(s) 206 continues operation and a status of the radio is sent to the spectrum manager 204 (S470) and the database manager 220 is updated.

As outlined above, licensor and sub-licensor parties need to have confidence that the sub-license is obtainable and once obtained is enforceable and auditable by the spectrum licensor, preferentially in near-real time. A commercial framework for the sub-license could consist of billing and accounting compensation linked to measured or assignable parameters such as the air time usage of the activated radios, the actual bandwidth assigned to the radios, which may be a portion of the sub-licensable spectrum, the cumulative data capacity transited over the sub-licensed spectrum, the number of radios, and the like. Once registered by the spectrum manager the micro-operator controller submits paramount control of the activation and deactivation of the radios 206 to the spectrum manager. The micro-operator may submit preferred operating configurations to the spectrum manager 204, which can then ascertain the compliance of such requests with the sub-licensing policy it administers and to which the micro-operator is bound. This verification, audit, or approval as the case is, may occur in real-time, and form part of the control and signaling under which the micro-operator and the radios are subject to the spectrum manager's authority or approval for radio emissions on the sub-licensed spectrum. Any modification of such applicable parameters of the radios and their utility in network radio devices of the micro-operator network would be subject to further approval by the spectrum manager, and such approval may be provided in real-time. If the network radio or micro-operator seeks to depart or actually does depart from the agreed sub-license terms, the sub-license is subject to revocation in whole or in part according to the agreed policy. Applicable parameters subject to monitoring and control in this context could include, without limitation, RF aspects such as EIRP, radio frequency, and physical aspects such as geo-location, or RF confinement by signal strength to defined area or geo-fence region. Some or all these parameters may be monitored by sensors discrete or embedded sensors that may be incorporated into the micro-operator network within its geo-region, which can include means to sense and characterize physical parameters such as frequency spectrum, RF strength, direction of signal arrival, and the like.

FIG. 5 is a flow chart disclosing a method for activating a radio 206 under a spectrum sub-license. At S500, the micro-operator 214 sends a request to the spectrum manager 204 for a sub-license to be provided to a specific radio 206. As outlined above, the micro-operator 214 may submit preferred operating configurations to the spectrum manager 204, which can then ascertain the compliance of such requests with the sub-licensing policy it administers and to which the micro-operator is bound. The micro-operator 214 then relays or sends authentication information relating to the specific radio 206 to the spectrum manager (S505). The radio devices 206 are verifiable as authentic by the spectrum manager 204 by accessing unique characteristics such as, but not limited to, the media access control number, the IP address, etc. The micro-operator 214 then receives configuration parameters for spectrum sub-license from the spectrum manager 206 (S510). The configuration parameters may be specified with or by a network device such as an edge controller unit, a wireless gateway unit, that performs the primary network administration and control function of the micro-operator network. Such parameters may include, the geolocation of discrete radios, EIRP, antenna array gain, radiated power, and the configurability and capability of each of the radios, their arrangement in an access point, and the antenna front ends connected to the radios through which RF is generated or received. At S515 the micro-operator 214 relays the configuration parameters to the specific radio 206, which is then configured to operate on the sub-licensed spectrum in accordance with the parameters of the sub-license (S520). The radio 206 confirms the configuration to the micro-operator 214 (S525), and the micro-operator 214 relays the configuration to the spectrum manager 204 (S530). Upon receiving the configuration from the micro-operator 214, the spectrum manager 204 sends an activation signal to the micro-operator 214 (S535), which then relays the activation signal to the radio (S540) to activate the radio (S545).

Next a process of monitoring radio 206 compliance with the sub-license will be described with reference to FIG. 6. At S600, the spectrum manager 204 established the sub-license terms and policy with a primary licensor at specific geolocations. Applicable parameters subject to control in this context could include, without limitation, RF aspects such as EIRP, radio frequency, and physical aspects such as geolocation, or RF confinement by signal strength to defined area or geo-fence region. Some or all these parameters may be monitored by sensors discrete or embedded sensors that may be incorporated into the micro-operator network within its geo-region, which can include means to sense and characterize physical parameters such as frequency spectrum, RF strength, direction of signal arrival, and the like. The spectrum manager 204 then activates the radio(s) 206 to operate within the terms of the spectrum sub-license in a micro-operator network 214 (S605). Once the radio(s) 206 are configured and activated, at S610 the spectrum manager 204 polls one or more of the micro-operator 214, radio(s) 206, available RF sensors within the micro-operator network to retrieve (S615) RF operating characteristics of the radio(s) 206 to determine compliance with the sub-license (S620). In the event that it is determined that the radio(s) 206 is not operating in compliant with the sub-license (No in S620), the radio(s) 206 is deactivated (S625) and the sub-license is revoked (S630). In the event that it is determined that the radio(s) 206 is operating in compliant with the sub-license (Yes in S620), the radio(s) 206 continues operation and the process returns to S610 to continue iterative monitoring of the radio(s) 206.

What is claimed is:

1. A wireless spectrum management system, comprising:
   Infrastructure equipment configured to:
      Independently administer the use of one or more radio frequency sub-licenses from a primary spectrum licensor, wherein the radio frequency sub-licenses specify physical terms of operation of radios at a specified geolocation and at specified radio frequencies, by:
      receiving radio frequency sub-licenses or related radio operating terms from a primary spectrum licensor;
      receiving requests from radio access networks to operate radios under a radio-frequency sub-license;
      configuring one or radios in a radio access network to operate in accordance with the terms of a radio frequency spectrum sub-license,
      authorizing or activating radio device(s) in one or more radio access networks to operate in accordance with one or more radio frequency sub-licenses;
      ascertaining the state of compliance or non-compliance of said radio devices and/or radio access networks by:
         receiving direct radio operating parameter data from radio(s) of said radio access network;
         receiving indirect radio frequency parameter data from one or more wireless sensors proximate to radios of said radio access networks;
         calculating whether either the direct radio operating parameter data or the indirect radio frequency parameter data exceeds specified terms of operation of said radio devices or radio access networks relative to one or more radio frequency sub-license(s);
         deauthorizing or deactivating all or part of the radio access network based on a determination of a state of non-compliance with respect to radio-frequency sub-license(s), and
         transmitting the compliance or non-compliance data of a radio access network, in relation to a spectrum sub-license, to a related primary spectrum licensor.

2. The system of claim 1, comprising one or more wireless sensors to characterize radio frequency emissions of one or more radios in a radio access network in relation to the physical terms of a radio-frequency sub-license.

3. The system of claim 1 operating under common control of a primary spectrum licensor's wireless network infrastructure equipment.

4. The system of claim 1 configured to hand over all or part of the administration of a radio frequency sub-license to the primary spectrum licensor's network infrastructure equipment.

5. The system of claim 1 configured to hand over administration of a radio or radio access network operating under a radio frequency sub-license to the primary spectrum licensor's network infrastructure equipment.

6. The system of claim 1 configured to administer the use of radio frequency sub-licenses from more than one primary spectrum licensor.

7. A radio or a radio access network configured in response to configuration data received from the system of claim 1.

* * * * *